US012479672B2

(12) United States Patent
Liu et al.

(10) Patent No.: US 12,479,672 B2
(45) Date of Patent: Nov. 25, 2025

(54) LOGISTICS PALLETIZING SYSTEM

(71) Applicants: SHANGHAI KELAI MECHATRONICS ENGINEERING CORP., Shanghai (CN); SHANGHAI OKWAY INTELLIGENT EQUIPMENT CO., LTD., Shanghai (CN)

(72) Inventors: Zongyang Liu, Shanghai (CN); Jianliang Su, Shanghai (CN); Wentao Yang, Shanghai (CN); Shili Tan, Shanghai (CN); Junjie Shen, Shanghai (CN); Yongyi He, Shanghai (CN)

(73) Assignees: Shanghai Kelai Mechatronics Engineering Corp., Shanghai (CN); Shanghai Okway Intelligent Equipment Co., Ltd., Shanghai (CN)

( * ) Notice: Subject to any disclaimer, the term of this patent is extended or adjusted under 35 U.S.C. 154(b) by 296 days.

(21) Appl. No.: 18/028,924

(22) PCT Filed: Aug. 6, 2021

(86) PCT No.: PCT/CN2021/111124
§ 371 (c)(1),
(2) Date: Mar. 28, 2023

(87) PCT Pub. No.: WO2022/062720
PCT Pub. Date: Mar. 31, 2022

(65) Prior Publication Data
US 2024/0025673 A1  Jan. 25, 2024

(30) Foreign Application Priority Data
Sep. 28, 2020  (CN) .......................... 202011045455.7
Jul. 13, 2021   (CN) .......................... 202121586397.9

(51) Int. Cl.
B65G 57/10  (2006.01)
B65G 37/00  (2006.01)
B65G 47/82  (2006.01)

(52) U.S. Cl.
CPC ............. B65G 57/10 (2013.01); B65G 37/00 (2013.01); B65G 47/82 (2013.01); B65G 2203/0283 (2013.01)

(58) Field of Classification Search
CPC ........ B65G 57/10; B65G 37/00; B65G 47/82; B65G 2203/0283; B65G 57/03; B65G 41/008
See application file for complete search history.

(56) References Cited

U.S. PATENT DOCUMENTS 3,536,209 A * 10/1970 Bates .................. B65G 1/0428
414/277
5,577,873 A * 11/1996 Tanaka ..................... B66F 9/18
414/400

(Continued)

FOREIGN PATENT DOCUMENTS

CN   102381563 B   9/2013
CN   103274194 A   9/2013

(Continued)

OTHER PUBLICATIONS

Chinese Office Action for CN Patent Application No. 202011045455.7 dated Aug. 15, 2024.
CN office action for CN202011045455.7 dated May 23, 2025.

Primary Examiner — Lynn E Schwenning
(74) Attorney, Agent, or Firm — Getz Balich LLC

(57) ABSTRACT

Provided is a logistics palletizing system. The logistics palletizing system includes a palletizer including a walking device, a telescopic platform device, a feeding device, a multi-stage lifting device and a feed diverting device, where the telescopic platform device is mounted above the walking (Continued)

device, the multi-stage lifting device and the feed diverting device are each mounted on the telescopic platform device, and the telescopic platform device is configured to drive the multi-stage lifting device and the feed diverting device to move in a preset direction relative to the walking device; and the feeding device is mounted on the multi-stage lifting device, the multi-stage lifting device is configured to drive the feeding device up and down, the feed diverting device is configured to convey materials to the feeding device, and the feeding device is configured to palletize the materials.

19 Claims, 18 Drawing Sheets

(56) References Cited

U.S. PATENT DOCUMENTS

| | | | |
|---|---|---|---|
| 8,074,431 | B1 | 12/2011 | Pierson |
| 10,099,869 | B2 * | 10/2018 | De Lama Arenales ..................... B65G 47/086 |

FOREIGN PATENT DOCUMENTS

| | | | | |
|---|---|---|---|---|
| CN | 104925533 | A | 9/2015 | |
| CN | 105564996 | * | 2/2016 | ............. B65G 41/00 |
| CN | 105564996 | A | 5/2016 | |
| CN | 205503045 | | 8/2016 | |
| CN | 206187795 | U | 5/2017 | |
| CN | 206278692 | U | 6/2017 | |
| CN | 107187881 | A | 9/2017 | |
| CN | 107381079 | | 11/2017 | |
| CN | 107499892 | | 12/2017 | |
| CN | 107499892 | A | 12/2017 | |
| CN | 209306434 | * | 8/2019 | ........... B65G 47/248 |
| CN | 110921261 | A | 3/2020 | |
| CN | 111483800 | A | 8/2020 | |
| CN | 112141724 | | 12/2020 | |
| CN | 213386739 | U | 6/2021 | |
| JP | H0920407 | | 1/1997 | |

* cited by examiner

LOGISTICS PALLETIZING SYSTEM

CROSS-REFERENCE TO RELATED APPLICATIONS

This is a National Stage Application filed under 35 U.S.C. 371 based on International Patent Application No. PCT/CN2021/111124, filed on Aug. 6, 2021, which claims priority to Chinese Patent Application No. 202011045455.7 filed on Sep. 28, 2020 and claims priority to Chinese Patent Application No. 202121586397.9 filed on Jul. 13, 2021, disclosures of all of which are incorporated herein by reference in their entireties.

TECHNICAL FIELD

The present application relates to the field of logistics palletizing equipment, for example, a logistics palletizing system.

BACKGROUND

In the logistics industry, material conveying often uses belts as a transmission tool to convey materials from the warehouse to the designated position, and then a palletizer palletizes the materials into piles, greatly improving the material conveying speed and solving the problem of low efficiency of the traditional manual handling.

However, in actual material conveying, it is often needed to make certain adjustments to the materials, such as adjusting posture of the materials from a horizontal landscape posture to a vertical portrait posture, to facilitate the palletizing work of the back-end palletizer. Moreover, the logistics palletizing system cannot automatically adjust the posture of the conveyed materials, and only manpower can be relied on to regularize the materials, which is low in efficiency and high in intensity. Although devices such as mechanical arms and dedicated turnover mechanisms are used in some pipeline conveying to achieve the posture adjustment of the materials to overcome the disadvantages of manual operations, such devices are usually complicated in structure and high in costs. Moreover, the design of the logistics palletizing system is single and cannot satisfy the increasing demand.

SUMMARY

The present application provides a logistics palletizing system capable of automatically conveying, diverting, posture adjusting and palletizing materials, improving the material processing efficiency, simplifying the structure of a posture adjustment mechanism, reducing the space occupation, and reducing the economic costs.

A logistics palletizing system includes a palletizer and a logistics conveying device.

The palletizer includes a feeding device, a feed diverting device, a telescopic platform device, a multi-stage lifting device and a walking device. The telescopic platform device is mounted above the walking device, the multi-stage lifting device and the feed diverting device are each mounted on the telescopic platform device, and the telescopic platform device is configured to drive both the multi-stage lifting device and the feed diverting device to move in a first preset direction relative to the walking device.

The feeding device is mounted on the multi-stage lifting device, the multi-stage lifting device is configured to drive the feeding device up and down, the feed diverting device is configured to convey materials to the feeding device, and the feeding device is configured to palletize the materials.

The logistics conveying device is connected to the palletizer. The logistics conveying device includes a posture adjustment mechanism and a conveying mechanism connected to the posture adjustment mechanism. The posture adjustment mechanism includes a movement assembly and a turnover assembly, the movement assembly includes a plurality of rotatable rolling portions, a gap is formed between each two adjacent rolling portions, and the plurality of rotatable rolling portions are configured to drive the materials to move. The turnover assembly includes a driving portion and a turnover portion, the turnover portion is drivingly connected to the driving portion, the driving portion is configured to drive the turnover portion to rotate, the turnover portion extends through gaps among the plurality of rotatable rolling portions, the turnover portion is configured to push the materials to a preset position, and the conveying mechanism is configured to convey the materials.

Figure 1:
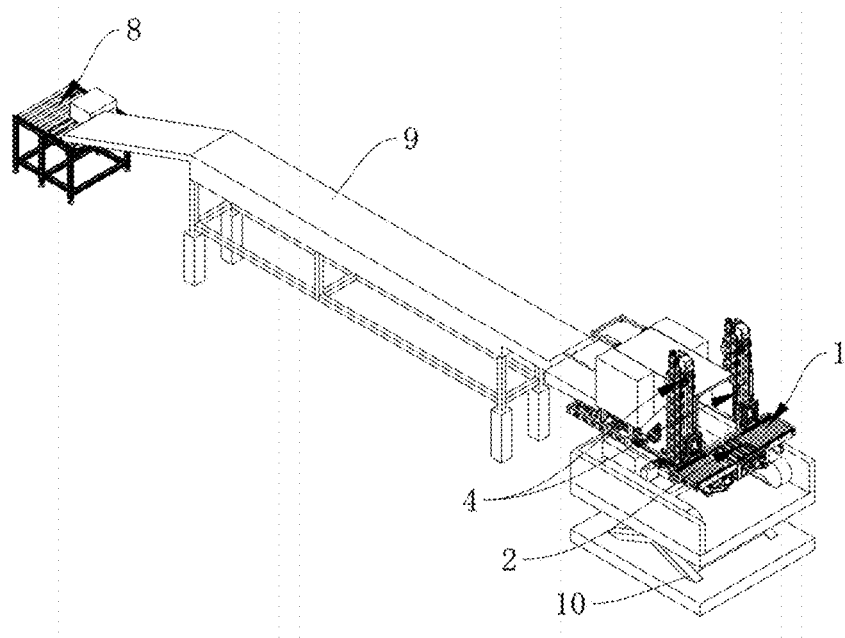
FIG. 1 is a view illustrating the overall structure of a logistics palletizing system according to an embodiment of the present application.
Figure 2:
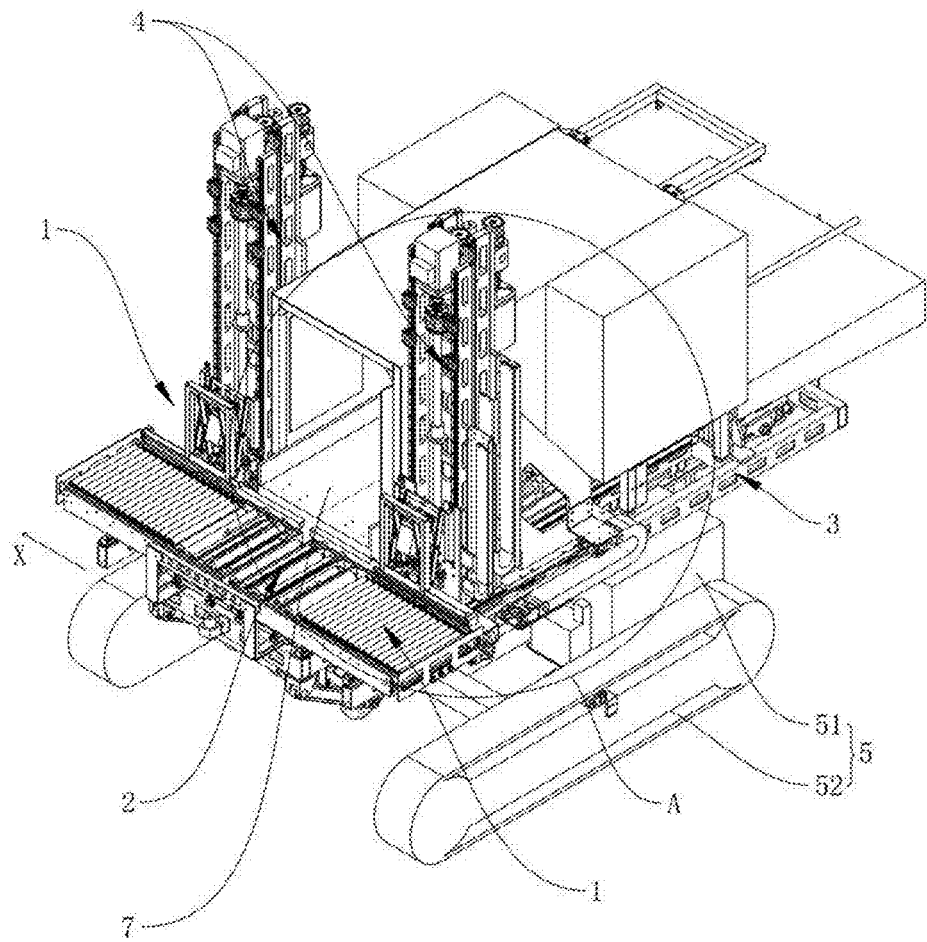
FIG. 2 is a structure view of a palletizer according to an embodiment of the present application.

REFERENCE LIST 1 feeding device
11 pallet mechanism
111 conveyor roller
112 second scissor arm member
113 driving plate
1131 position sensor
114 housing body
1141 first slide groove
115 slide plate
1151 second slide groove
12 push plate mechanism
121 fixed plate
122 telescopic assembly
1221 first scissor arm member
12211 front scissor arm
12212 rear scissor arm
12213 first connecting shaft
1222 first driving member
123 push plate assembly
1231 push plate
12311 fixed shaft
1232 first push bar
1233 second push bar
12333 clamping groove
2 feed diverting device
21 seat
22 rotary assembly
221 first rotary assembly
222 second rotary assembly
2211 first Mecanum wheel
2212 bearing
2213 rotary shaft
23 driving assembly
231 first driving motor
232 first conveyor belt
233 tension wheel set
3 telescopic platform device
31 primary telescopic platform
311 first mounting station
312 second mounting station
32 secondary telescopic platform
321 first axle
322 second axle
323 first guide rail
33 submount
331 second driving member
332 third mounting station
333 fourth mounting station
334 second guide rail
335 positioning seat
34 speed-doubling telescopic assembly
341 first chain
342 second chain
35 first landing gear assembly
351 first connecting rod
352 first roller
353 third driving member
36 second landing gear assembly
361 second connecting rod
362 second roller
363 fourth driving member
4 multi-stage lifting device
41 primary lifting mechanism
411 first bracket
412 second driving motor
413 first lead screw
42 secondary lifting mechanism
421 second bracket
422 third driving motor
423 second lead screw
424 first synchronous belt
43 fixed seat
5 walking device
51 chassis
52 movement mechanism
6 regularized device
61 regularized bracket
62 servo motor
63 regularized plate
64 triangular reinforcing plate
7 conveyor belt
71 synchronous belt
72 second rotary shaft
73 second Mecanum wheel
74 guide plate
8 posture adjustment mechanism
81 rack
82 movement assembly
821 rolling portion
822 movement driving portion
83 turnover assembly
831 driving portion
8311 first rotary shaft
8312 hinge
8313 first telescopic cylinder
832 turnover portion
8321 turnover pawl
833 connector
84 first stop assembly
841 base
8411 fixed sleeve
842 elastic connector
843 stop
85 second stop assembly
851 second telescopic cylinder
852 stop wheel
86 stop portion
9 conveying mechanism
100 hydraulic lifting platform
200 translation device
210 translation cylinder
220 first slide rail 230 first slider
300 body portion
370 housing

DETAILED DESCRIPTION

Technical solutions of the present application will be described below with reference to the drawings.

In the description of the present application, unless otherwise specified and limited, the term "connected to each other", "connected" or "secured" is to be construed in a broad sense, for example, as securely connected, detachably connected, or integrated; mechanically connected or electrically connected; directly connected to each other or indirectly connected to each other via an intermediary; or internally connected between two elements or interaction relations between two elements. Specific meanings of the preceding terms in the present application may be understood based on specific situations.

In the present application, unless otherwise specified and limited, when a first feature is described as "on" or "below" a second feature, the first feature and the second feature may be in direct contact or be in contact via another feature between the two features instead of being in direct contact. Moreover, when the first feature is described as "on", "above" or "over" the second feature, the first feature is right on, above or over the second feature or the first feature is obliquely on, above or over the second feature, or the first feature is simply at a higher level than the second feature. When the first feature is described as "under", "below", or "underneath" the second feature, the first feature is right under, below, or underneath the second feature or the first feature is obliquely under, below, or underneath the second feature, or the first feature is simply at a lower level than the second feature.

The solutions of the present application are described hereinafter in conjunction with drawings and embodiments.

The present application provides a logistics palletizing system, as shown in FIGS. 1 to 28. The logistics palletizing system includes a palletizer and a logistics conveying device. The palletizer is connected to the logistics conveying device. The palletizer includes feeding devices 1, a feed diverting device 2, telescopic platform devices 3, multi-stage lifting devices 4 and walking devices 5. The telescopic platform devices 3 are mounted above the walking devices 5. A multi-stage lifting device 4 and a feed diverting device 2 are each mounted on a telescopic platform device 3, and the telescopic platform devices 3 are configured to drive the multi-stage lifting devices 4 and the feed diverting device 2 to move in a first preset direction relative to the walking devices 5. A feeding device 1 is mounted on the multi-stage lifting device 4, the multi-stage lifting device 4 is configured to drive the feeding device 1 up and down, the feed diverting device 2 is configured to convey materials to the feeding devices 1, and the feeding devices 1 are configured to palletize the materials. The logistics conveying device includes a posture adjustment mechanism 8 and a conveying mechanism 9 connected to the posture adjustment mechanism 8, where the posture adjustment mechanism 8 includes a movement assembly 82 and a turnover assembly 83, the movement assembly 82 includes multiple rotatable rolling portions 821, a gap is formed between each two adjacent rolling portions 821, and the materials can be driven to move by the rolling portions 821. The turnover assembly 83 includes a driving portion 831 and a turnover portion 832, the turnover portion 832 is drivingly connected to the driving portion 831 and the turnover portion 832 can be driven to rotate by the driving portion 831, and the turnover portion 832 extends through gaps among the multiple rotatable rolling portions 821 to push the materials to rotate to a preset position. The conveying mechanism 9 is configured to convey the materials. The logistics palletizing system provided by the present application is capable of automatically conveying, diverting, posture adjusting, and palletizing the materials, thereby improving the material processing efficiency, simplifying the structure of the posture adjustment mechanism 8, reducing the space occupation, and reducing the economic costs.

The feeding device 1 includes a pallet mechanism 11, a push plate mechanism 12 and a fixed plate 121, where the pallet mechanism 11 and the push plate mechanism 12 are each mounted on the multi-stage lifting device 4 through the fixed plate 121, the pallet mechanism 11 is configured to carry the materials, the pallet mechanism 11 is adjustable in length in an X direction, the push plate mechanism 12 is disposed on a first side of the pallet mechanism 11) and is configured to push the materials on the pallet mechanism 11 toward a second side of the pallet mechanism 11 to palletize the materials, the push plate mechanism 12 includes a push plate assembly 123 and a telescopic assembly 122, where the telescopic assembly 122 is mounted on the fixed plate 121 and drivingly connected to the push plate assembly 123 and is configured to drive the push plate assembly 123 to push down the materials.

The pallet mechanism 11 of the feeding device 1 is configured to carry the materials conveyed by the feed diverting device 2 and is adjustable in length in the X direction. In this manner, the pallet mechanism 11 can be applicable to a truck container or a container of various widths as the quantity of the materials to be placed is increased, having a wide applicability, and improving the material palletizing efficiency. When the telescopic assembly 122 of the push plate mechanism 12 extends, the telescopic assembly 122 drives the push plate assembly 123 to push down the materials to palletize the materials. When the push plate mechanism 12 does not work, the telescopic assembly 122 is retracted to reduce the volume occupied by the push plate mechanism 12, thereby achieving the application of the push plate mechanism 12 in a narrow space. The multi-stage lifting device 4 can drive the feeding device 1 and the feed diverting device 2 up and down, thereby increasing the maximum palletizing height of the palletizer. The palletizer includes a walking device 5 that facilitates the movement of the palletizer. When there is an obstacle on the ground or when the palletizer is applied to a gooseneck truck, the walking device 5 cannot cross the obstacle, the telescopic platform device 3 of the palletizer can drive the feeding device 1 to telescope forward so that the feeding device 1 can place the materials on a gooseneck platform within the gooseneck truck or on a distal end of the obstacle, improving the practicality of the palletizer.

Figure 3:
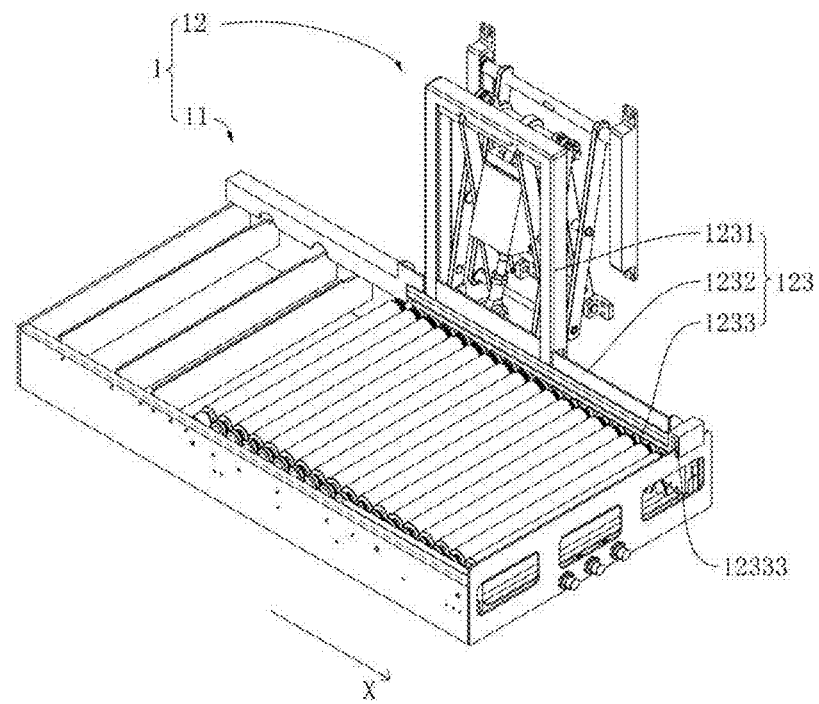
FIG. 3 is a structure view of a feeding device according to an embodiment of the present application.
Figure 4:
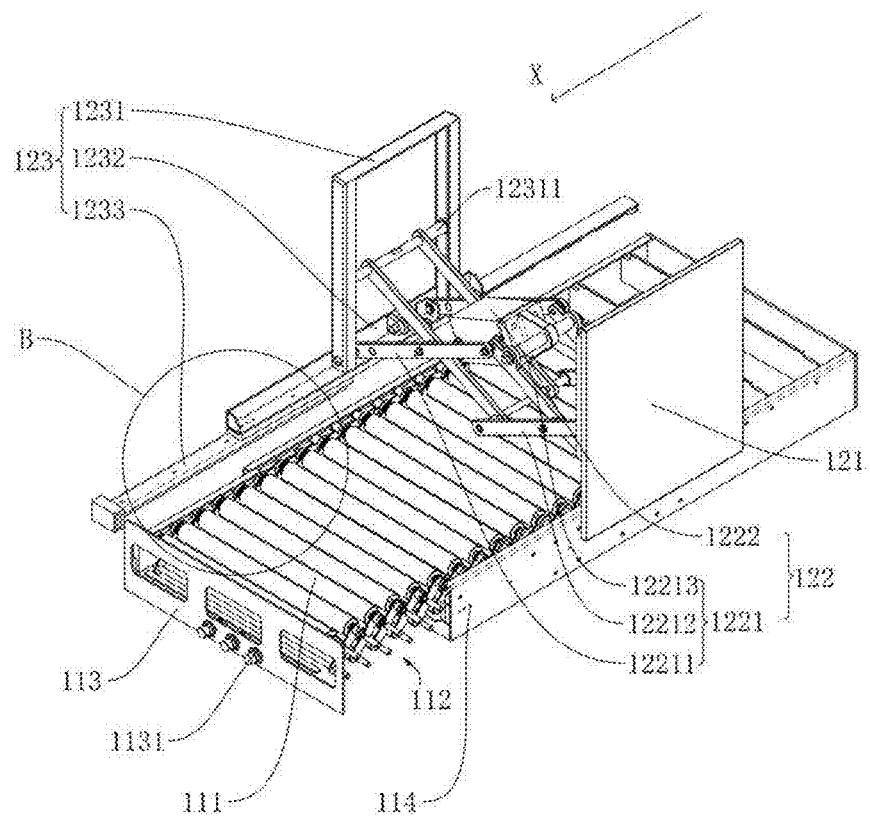
FIG. 4 is a structure view taken when a telescopic assembly of a feeding device extends according to an embodiment of the present application.
Figure 5:
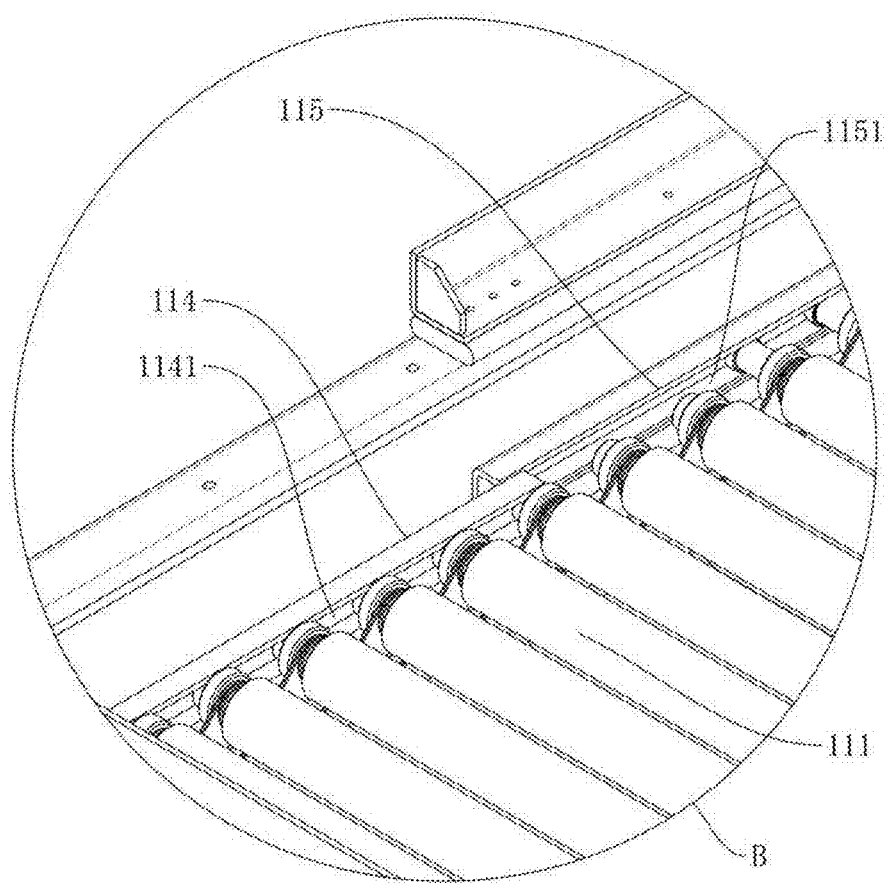
FIG. 5 is an enlarged view of part B of FIG. 4.

As shown in FIGS. 3 to 5, the telescopic assembly 122 includes a first scissor arm member 1221 and a first driving member 1222, one end of the first scissor arm member 1221 is hinged to the fixed plate 121 and the other end of the first scissor arm member 1221 is drivingly connected to the push plate assembly 123, the first driving member 1222 is drivingly connected to the first scissor arm member 1221, the first driving member 1222 is configured to drive the first scissor arm member 1221 to elongate or shorten. The first scissor arm member 1221 includes two sets of opposite front scissor arms 12211 and two sets of opposite rear scissor arms 12212, where each set of front scissor arms 12211 and each set of rear scissor arms 12212 includes two scissor arms that are centrally hinged. The two sets of opposite front scissor arms 12211 are hinged to the two sets of opposite rear scissor arms 12212 to form multiple first hinge points, and opposite first hinge points are connected through a first connecting shaft 12213. One end of each front scissor arm 12211 away from a respective rear scissor arm 12212 is hinged to the push plate assembly 123, and one end of each rear scissor arm 12212 away from a respective front scissor arm 12211 is hinged to the fixed plate 121.

In this embodiment, two first connecting shafts 12213 are needed for connection in total. One end of the first driving member 1222 is hinged to one first connecting shaft 12213 of the two first connecting shafts 12213, and the other end of the first driving member 1222 is hinged to the push plate assembly 123. The first driving member 1222 is a cylinder. One end of the cylinder is hinged to one first connecting shaft 12213 of the two first connecting shafts 12213, and the other end of the cylinder is hinged to the push plate assembly 123. When the cylinder extends, the push plate assembly 123 moves in a direction away from the first connecting shaft 12213 to palletize the materials, in this case, the first scissor arm member 1221 is elongated. When the cylinder retracts, the cylinder moves in a direction facing the first connecting shaft 12213, in this case, the first scissor arm member 1221 is shortened to reset the push plate assembly 123. In other embodiments, the first driving member 1222 may also be an oil cylinder. The push plate assembly 123 includes a push plate 1231, a first push bar 1232 and a second push bar 1233, where the first push bar 1232 is secured to the bottom of the push plate 1231, and the second push bar 1233 is slidably connected in a length direction of the first push bar 1232. To achieve the slidable connection between the first push bar 1232 and the second push bar 1233, one of the first push bar 1232 or the second push bar 1233 is provided with a slide groove, and the other of the first push bar 1232 or the second push bar 1233 is slidably engaged in the slide groove. Since the friction at the bottom of the material is relatively large, a driving end of the first driving member 1222 is hinged to the first push bar 1232 to increase the thrust at the bottom of the push plate assembly 123 and improve the stability of pushing down the material.

The second push bar 1233 is provided with a clamping groove 12333, the clamping groove is clamped to an edge of the pallet mechanism 11, and the pallet mechanism 11 can drive the second push bar 233 to elongate or shorten so that the total length of the first push bar 1232 and the second push bar 1233 varies with the length of the pallet mechanism 11.

In this embodiment, a fixed shaft 12311 is disposed on the push plate 1231, one front scissor arm 12211 of the each set of front scissor arms 12211 is hinged to the fixed shaft 12311, and the other front scissor arm 12211 of the each set of front scissor arms 12211 is hinged to the first push bar 1232. The push plate 1231 increases the area where the material is subjected to the force, and increases the stability of pushing down and palletizing the materials. In this embodiment, the first push bar 1232 and the second push bar 1233 are disposed at the bottom of the push plate assembly 123 to act on the materials. When the length of the pallet mechanism 11 is adjusted in the X direction, the number of materials in the X direction increases, and the total length of the first push bar 1232 and the second push bar 1233 is accordingly adjusted to maximumly increase the force bearing area of the material, improving the stability of pushing down the materials and the efficiency of palletizing the materials.

The pallet mechanism 11 includes multiple conveyor rollers 111 and a second scissor arm member 112 arranged in the X direction, where the second scissor arm member 112 includes multiple scissor arms that are hinged to each other, multiple second hinge points are formed among the multiple scissor arms, and the materials are carried on the pallet mechanism 11.

Therefore, opposite second hinge points located above the second scissor arm member 112 are connected through the multiple conveyor rollers 111, the multiple conveyor rollers 111 are spaced apart in the X direction. When the materials enter through a feed port of the pallet mechanism 11, the conveyor rollers 111, on the one hand, can carry the materials and, on the other hand, facilitate the conveying of the materials in the X direction. The length of the second scissor arm member 112 is adjustable so that spacings of the multiple conveyor rollers 111 are adjustable and can be adaptively adjusted according to the storage space of the container. Opposite second hinge points located below the second scissor arm member 112 are connected through a second connecting shaft.

As shown in FIGS. 4 (a slide plate 115 on one side is hidden in FIG. 4) and 5, the pallet mechanism 11 also includes a driving plate 113 and a housing body 114, an inner sidewall of the housing body 114 is provided with a first slide groove 1141, and two ends of each of a part of the conveyor rollers 111 are slidably connected to first slide grooves 1141. The housing body 114, on the one hand, supports the second scissor arm member 112 and, on the other hand, also guides the second scissor arm member 112. The driving plate 113 is drivingly connected to a driver. The driver can drive the driving plate 113 to move in the X direction. The driving plate 113 is connected to one end of the second scissor arm member 112, and the driving plate 113 can drive the second scissor arm member 112 to elongate or shorten in the X direction to adjust the carrying area for the materials and have strong versatility. The driver may be a device capable of driving the driving plate 113 to move, such as a cylinder or an oil cylinder. The slide plate 115 is slidably formed on the inner sidewall of the housing body 114 and is provided with a second slide groove 1151, a part of the conveyor rollers 111 can be slidably connected to the second slide groove 1151, and the slide plate 115 is connected to the driving plate 113. When the driving plate 113 moves, the driving plate 113 can drive the slide plate 115 to slide relative to the inner sidewall of the housing body 114, and meanwhile, the length of the slide groove required by the conveyor rollers 111 and the supporting strength of the second scissor arm member 112 can be increased.

The clamping groove 12333 of the second push bar 1233 is clamped to the driving plate 113. When moving in the X direction, the driving plate 113 can drive the second push bar 1233 to move so that the second push bar 1233 is elongated or shortened, and thus the total length of the first push bar 1232 and the second push bar 1233 changes as the length of the pallet mechanism 11 changes. Moreover, when the first push bar 1232 and the second push bar 1233 push the material, the driving plate 113 can also guide the first push bar 1232 and the second push bar 1233.

In this embodiment, a position sensor 1131 is also disposed on the driving plate 113 and is configured to measure the distance from the driving plate 113 to the obstacle. When this palletizer is disposed in the container, the length of the pallet mechanism 11 is adjusted to the maximum length according to the width of the sidewall of the container, and the position sensor 1131 is configured to detect the distance from the driving plate 113 to the sidewall of the container so that the distance from the driving plate 113 to the sidewall of the container satisfies the minimum allowable distance, improving the palletizing efficiency of the palletizer, and achieving the full-flexible automatic positioning for trucks of different widths.

The number of feeding devices 1 is two and the number of multi-stage lifting devices 4 is two, one feeding device 1 is mounted on one multi-stage lifting device 4, and the two multi-stage lifting devices 4 synchronously drive the two feeding devices 1 up and down. The feed diverting device 2 is disposed between the two feeding devices 1 and is configured to convey the materials to the two feeding devices 1 to increase the single palletizing amount of the palletizer.

Figure 6:
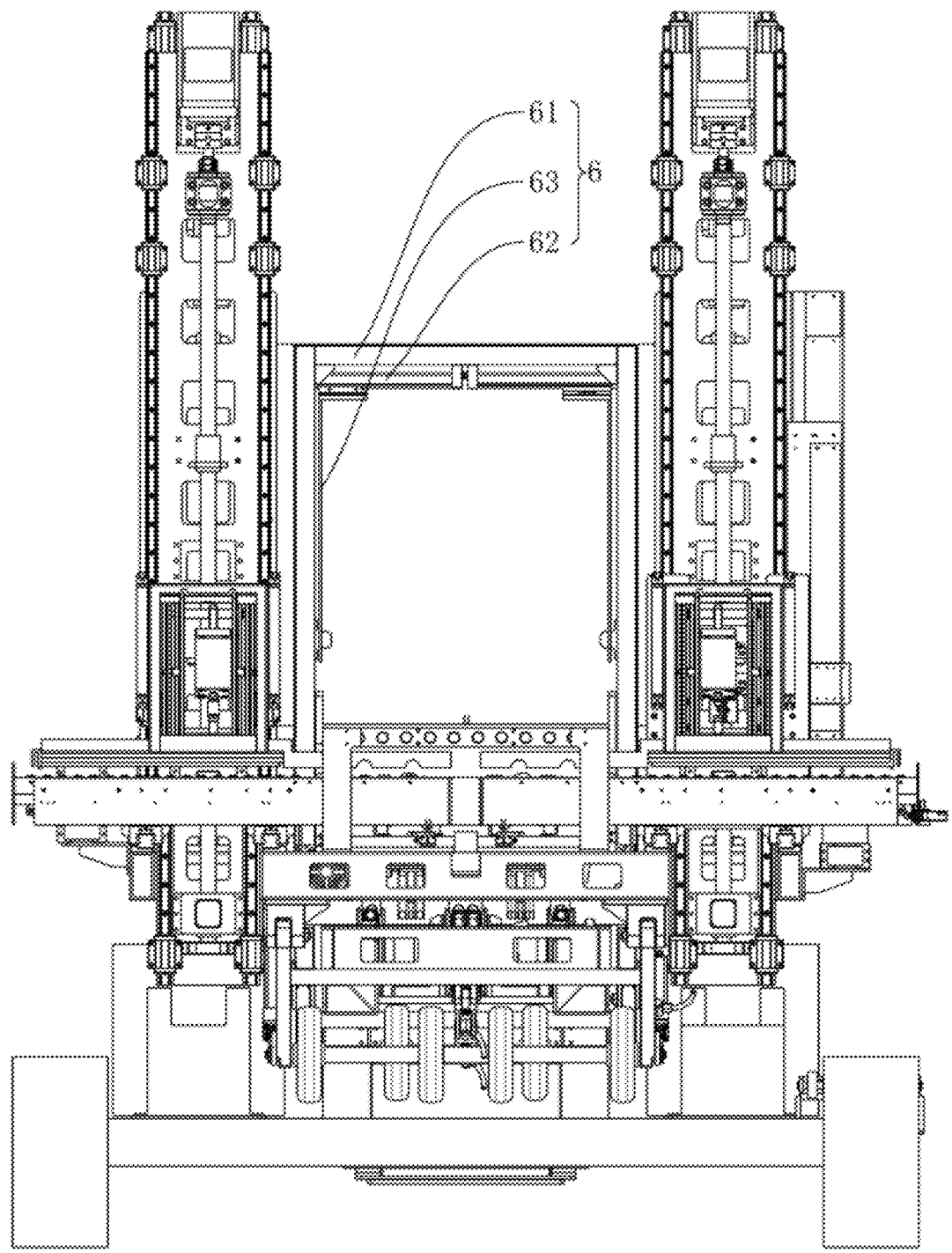
FIG. 6 is a front view of a palletizer according to an embodiment of the present application.

A distributor mechanism is disposed at the inlet of the palletizer and distributes the materials into two columns for conveying to improve the efficiency. Moreover, a conveyor belt 7 is disposed between the distributor mechanism and the feed diverting device 2, and the conveyor belt 7 upstream of the feed diverting device 2 conveys the materials to the feed diverting device 2, and then the feed diverting device 2 conveys the material to the two feeding devices 1. Since the two columns of materials are not necessarily located in the middle as moving on the conveyor belt 7, as shown in FIG. 6, a regularized device 6 is also disposed above the conveyor belt 7, the regularized device includes a regularized bracket 61, two servo motors 62 and two regularized plates 63, where the two servo motors 62 are mounted on the top of the regularized bracket 61 and located above the conveyor belt 7, each servo motor 62 is mounted with one regularized plate 63 and drives the one regularized plate 63 toward the middle of the conveyor belt 7, and thus the two regularized plates 63 push the two columns of materials to the middle of the conveyor belt 7 to make the posture of the materials is unified as entering the feed diverting device 2, improving the conveying stability.

In this embodiment, the distributor mechanism and the feed diverting device 2 have same structures, except that the mounting positions are different.

Figure 7:
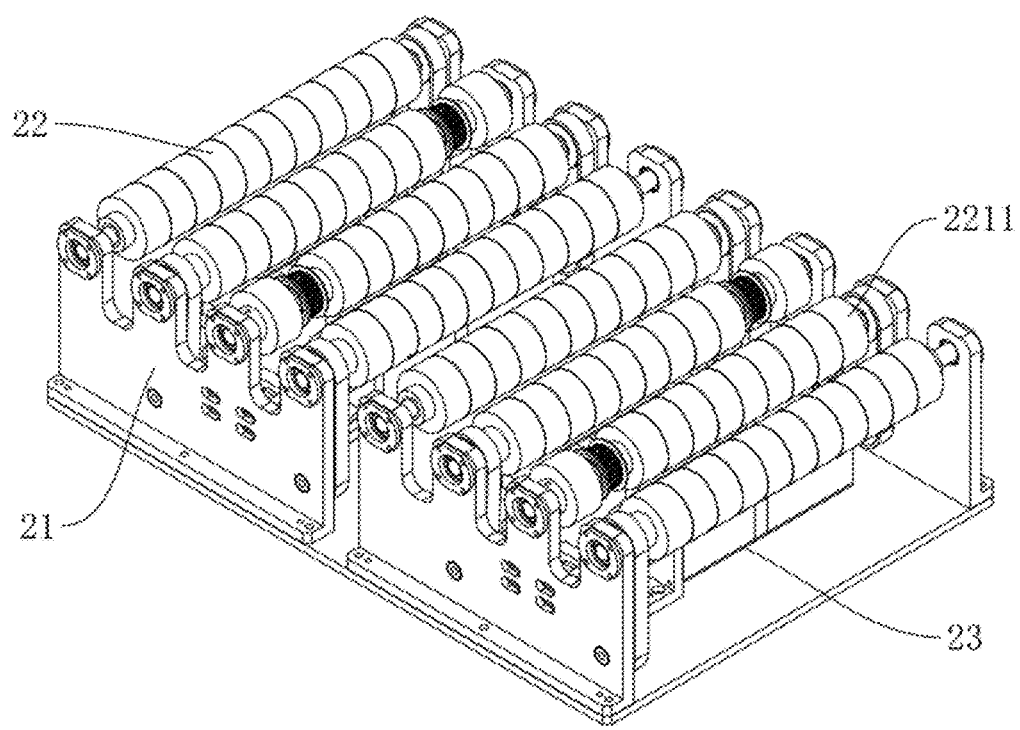
FIG. 7 is a view illustrating the overall structure of a feed diverting device according to an embodiment of the present application.
Figure 8:
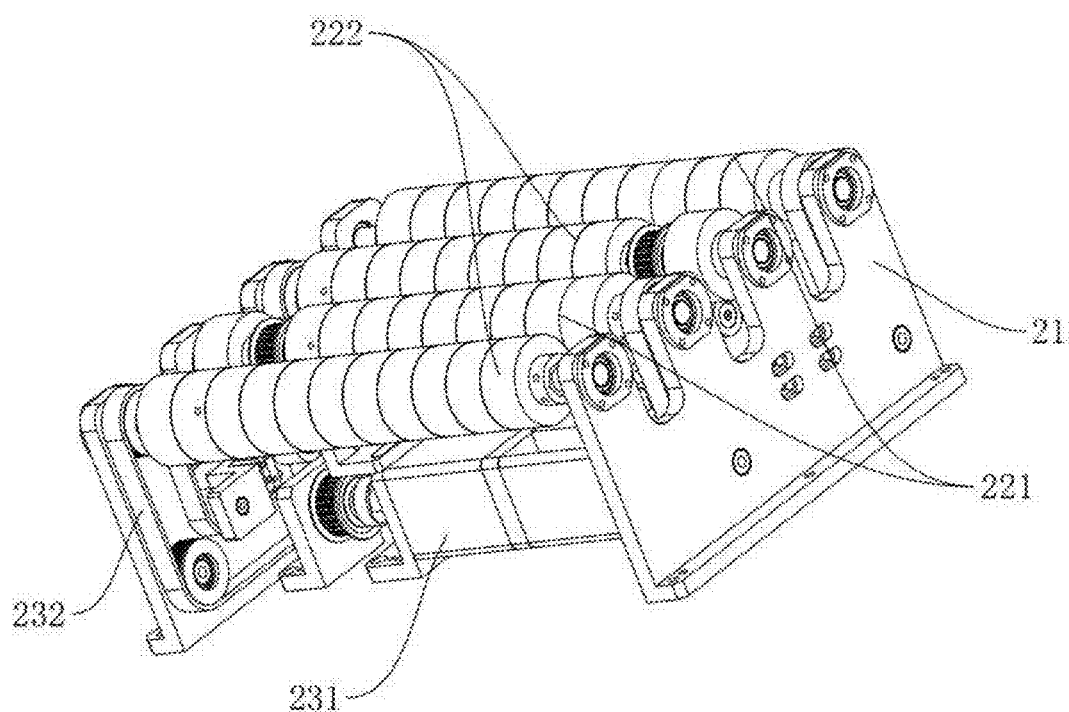
FIG. 8 is a partial structure view of a feed diverting device according to an embodiment of the present application.
Figure 9:
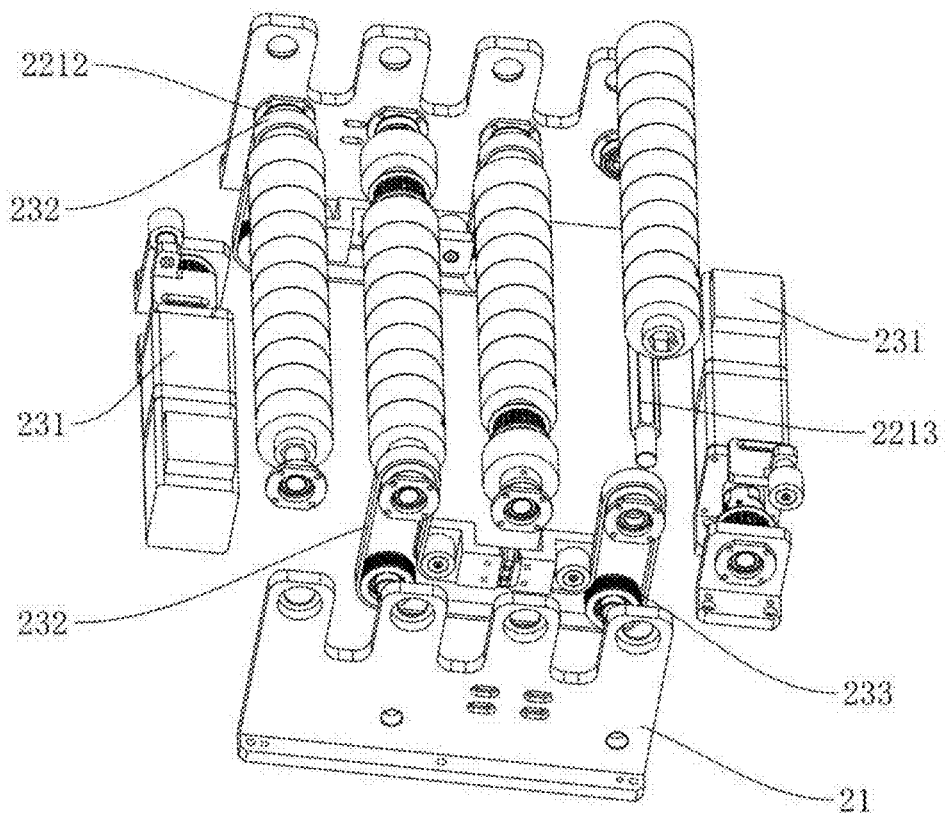
FIG. 9 is a partial structure view of disassembling a feed diverting device according to an embodiment of the present application.

As shown in FIGS. 7 to 9, the feed diverting device 2 includes a seat 21, multiple rotary assemblies 22 and a driving assembly 23. The multiple rotary assemblies 22 and the driving assembly 23 are disposed on the seat 21, and the multiple rotary assemblies 22 are connected to the driving assembly 23. The seat 21 is configured to support the whole feed diverting device 22 to ensure the stability of the feed diverting device 2. The multiple rotary assemblies 22 are rotatably disposed on the seat 21. Multiple first Mecanum wheels 2211 are fixedly disposed on each rotary assembly 22. The rotary assembly 22 can drive the multiple first Mecanum wheels 2211 to rotate to drive the materials to move in a preset direction to achieve the diversion. The driving assembly 23 is drivingly connected to the multiple rotary assemblies 22, and the multiple rotary assemblies 22 can be driven to rotate by the driving assembly 23 to rotate the first Mecanum wheels 2211 to achieve the material diversion.

Optionally, the seat 21 is secured to the used platform to support and secure the whole feed diverting device 2.

Multiple small axles are obliquely distributed on the rim of each first Mecanum wheel 2211, and a horizontal motion vector and a vertical motion vector will exist on the small axles when the small axles rotate obliquely, and the structure and the principle are not repeated herein. Multiple first Mecanum wheels 2211 are provided and are equally spaced so that the materials are subjected to the uniform force and the manufacturing cost is taken into account.

The multiple rotary assemblies 22 include multiple first rotary assemblies 221 and multiple second rotary assemblies 222. The first Mecanum wheels 2211 on the first rotary assemblies 221 and the first Mecanum wheels 2211 on the second rotary assemblies 222 have opposite mounting directions, and the multiple first rotary assemblies 221 and the multiple second rotary assemblies 222 are alternately arranged in sequence. According to this arrangement, when the multiple first rotary assemblies 221 and the multiple second rotary assemblies 222 rotate in the same direction, vertical motion vectors of the first Mecanum wheels 2211 on the first rotary assemblies 221 and vertical motion vectors of the first Mecanum wheels 2211 on the second rotary assemblies 222 are equal in size and opposite in direction to cancel each other out, and horizontal motion vectors are the same in direction to superimpose each other, thereby driving the materials to move in the horizontal direction (to left or to right) to achieve the material diversion; and when the multiple first rotary assemblies 221 and the multiple second rotary assemblies 222 rotate in opposite directions, horizontal motion vectors of the first Mecanum wheels 2211 on the first rotary assemblies 221 and horizontal motion vectors of the first Mecanum wheels 2211 on the second rotary assemblies 222 are equal in size and opposite in direction to cancel each other out, and the vertical motion vectors are the same in direction to superimpose each other, thereby driving the materials to move in the horizontal direction (to forward or backward) to achieve the material diversion. In the present application, the mounting directions of the first Mecanum wheels 2211 on the first rotary assemblies 221 and the second rotary assemblies 222 are opposite so that the multi-directional movement in forward, backward, left and right directions and diversion of the materials can be achieved by controlling the rotary directions of the first rotary assemblies 221 and the second rotary assemblies 222, and the structure is simple and has strong flexibility.

The rotary assembly 22 includes a bearing 2212 and a rotary shaft 2213, where the bearing 2212 is fixedly mounted on the seat 21, two ends of the rotary shaft 2213 are mounted on the seat 21 through the bearing 2212, the multiple first Mecanum wheels 2211 are fixedly sleeved on the outer periphery of the rotary shaft 2213 to rotate with the rotary of the rotary shaft 2213, thereby driving the materials to move in multiple directions. Multiple first Mecanum wheels 2211 are equally spaced and disposed on the rotary shaft 2213.

Optionally, each driving assembly 23 includes a first driving motor 231 and a first conveyor belt 232 drivingly connected to the first driving motor 231, where the first driving motor 231 is fixedly mounted on the seat 21, and the first conveyor belt 231 is drivingly connected to the rotary assembly 22 to drive the rotary assembly 22 to rotate.

Optionally, the first driving motor 231 is a forward-reverse motor, the rotary direction of the rotary shaft 2213 can be controlled by the forward rotation and reverse rotation so that the rotary direction of the first Mecanum wheels 2211 can be controlled and the movement diversion of the materials in different directions can be achieved. The first driving motor 231 is a speed-regulating motor. The rotary speed of the rotary assembly 22 can be controlled by regulating the rotary speed of the first driving motor 231 so that the diversion speed of the feed diverting device 2 can be regulated conveniently.

For example, the first conveyor belt 232 is drivingly connected to the rotary shaft 2213 to achieve the rotary of the rotary shaft 2213. Optionally, two first driving motors 231 are provided and two first conveyor belts 232 are provided. Two first driving motors 231 and two first conveyor belts 232 are provided to control the first rotary assemblies 221 and the second rotary assemblies 222, respectively. In other embodiments, the number of first driving motors 231 and the number of first conveyor belts 232 may be set as needed and are not limited in this embodiment.

The first rotary assemblies 221 and the second rotary assemblies 222 are driven to rotate by two driving assemblies 23, respectively. For example, the two first conveyor belts 232 are connected to the multiple first rotary assemblies 221 and the multiple second rotary assemblies 222, respectively, so as to control the multiple first rotary assemblies 221 and the multiple second rotary assemblies 222, respectively. Meanwhile, the first rotary assemblies 221 and the second rotary assemblies 222 are driven to rotate by the two first driving motors 231, respectively. The two first driving motors 231 are controlled in the same or reverse directions so that the first rotary assemblies 221 and the second rotary assemblies 222 can be controlled to rotate in the same or reverse directions to achieve the reliable diversion of the materials in the forward, backward, left and right directions.

The each driving assembly 23 also includes a tension wheel set 233, where the tension wheel set 233 is rotatably mounted on the seat 21 and is configured to tension the first conveyor belt 232 to ensure the normal working of the first conveyor belt 232. The tension wheel set 233 includes multiple tension wheels. Each tension wheel abuts the first conveyor belt 232 to tension multiple positions of the first conveyor belt 232. Meanwhile, the position design of the tension wheel set 233 on the seat 21 can change the setting path and improve the setting flexibility of the first conveyor belt 232, so as to avoid obstructing other structures.

Figure 10:
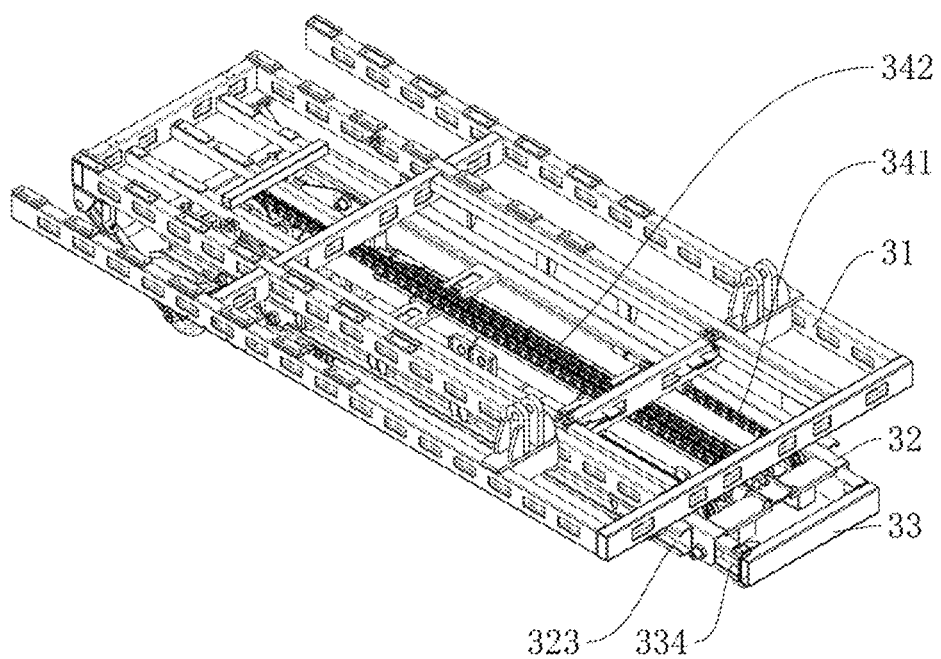
FIG. 10 is a structure view of a telescopic platform device according to an embodiment of the present application.
Figure 11:
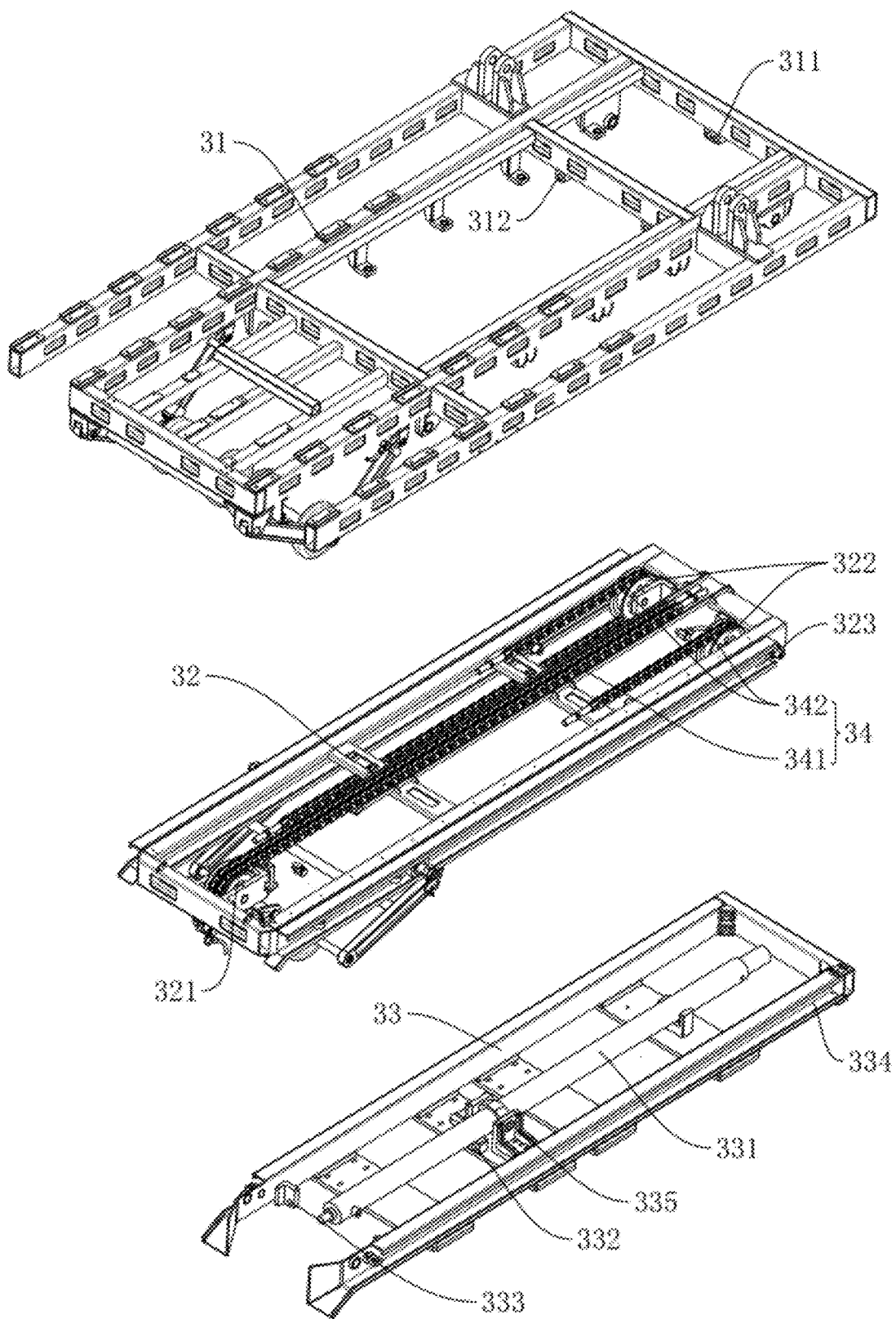
FIG. 11 is an exploded view of a telescopic platform device according to an embodiment of the present application.

For example, as shown in FIGS. 10 and 11, the telescopic platform device 3 includes a primary telescopic platform 31, a secondary telescopic platform 32, a submount 33 and a speed-doubling telescopic assembly 34, a first landing gear assembly 35, a second landing gear assembly 36, and a calibration assembly. The primary telescopic platform 31 is configured to carry the multi-stage lifting devices 4. The secondary telescopic platform 32 is located below the primary telescopic platform 31. The primary telescopic platform 31 is slidably connected to the secondary telescopic platform 32. The submount 33 is mounted on the walking device 5 and located below the secondary telescopic platform 32. The secondary telescopic platform 32 is slidably connected to the submount 33. The Second driving member 331 is disposed on the submount 33 and can drive the secondary telescopic platform 32 to extend and retract. The submount 33 is drivingly connected to the primary telescopic platform 31 through the speed-doubling telescopic assembly 34.

When working, the feeding device 1 is mounted on the primary telescopic platform 31. When the palletizer needs to palletize the materials on the gooseneck platform of the gooseneck truck, the second driving members 331 on the submount 33 drive the second telescopic platform 32 to move in a direction away from the submount 33, and the secondary telescopic platform 32 drives the primary telescopic platform 31 to move in the direction away from the submount 33. In this case, driven by the speed-doubling telescopic assembly 34, the double-speed telescopic assembly 34 drives the primary telescopic platform 31 to move in a direction away from the secondary telescopic platform 32 so that the telescopic platform device 3 achieves a secondary elongation to make the feeding device 1 palletize the materials on the gooseneck platform within the gooseneck truck. When the materials have been palletized on the gooseneck platform of the gooseneck truck, the second driving members 331 on the submount 33 drive the secondary telescopic platform 32 to move in a direction facing the submount 33, the secondary telescopic platform 32 drives the primary telescopic platform 31 to move in the direction facing the submount 33. In this case, driven by the speed-doubling telescopic assembly 34, the double-speed telescopic assembly 34 drives the primary telescopic platform 31 to move in a direction facing the secondary telescopic platform 32 to reset the primary telescopic platform 31 and the secondary telescopic platform 32.

In this embodiment, the second driving member 331 is an oil cylinder, where one end of the oil cylinder is secured to the submount 33, and the driving rod of the oil cylinder is drivingly connected to the secondary telescopic platform 32 to make the oil cylinder drives the secondary telescopic platform 32 to move relative to the submount 33. Multiple positioning seats 335 are formed on the submount 33, and the oil cylinder is secured to a respective positioning seat 335. Each second driving member 331 may also be a lead screw drive and is not limited in this embodiment.

The outer sidewall of the secondary telescopic platform 32 is provided with a first guide rail 323, and a first pulley matched with the first guide rail 323 is disposed on each of two sides of the primary telescopic platform 31 and is slidably connected to the first guide rail 323. The outer sidewall of the primary telescopic platform 31 is provided with a second guide rail 334, and a second pulley matched with the second guide rail 334 is disposed on each of two sides of the secondary telescopic platform 32 and is slidably connected to the second guide rail 334.

In this embodiment, a first end of a part is one end of the part away from a station to be palletized, and a second end of the part is one end of the part close to the station to be palletized. In this embodiment, the double-speed telescopic assembly 34 includes a first chain 341 and a second chain 342. A first axle 321 is disposed on a second end of the secondary telescopic platform 32, and a second axle 322 is disposed on a first end of the secondary telescopic platform 32. The first chain 341 is wound around the first axle 321, one end of the first chain 341 is connected to a first mounting station 311 on a first end of the primary telescopic platform 31, the other end of the first chain 341 is connected to a third mounting station of the submount 33, and the first chain 341 is configured to drive the primary telescopic platform 31 to move in the direction away from the secondary telescopic platform 32. The second chain 342 is wound around the second axle 322, one end of the second chain 342 is connected to a second mounting station on the first end of the primary telescopic platform 31, the other end of the second chain 342 is connected to a fourth mounting position of the submount 33, and the second chain 342 is configured to drive the primary telescopic platform 31 to move in the direction facing the secondary telescopic platform 32.

When the secondary telescopic platform 32 moves in the direction away from the submount 33, the primary telescopic platform 31 also needs to move with the secondary telescopic platform 32. Meanwhile, the primary telescopic platform 31 is pulled by the first chain 341 so that the primary telescopic platform 31 extends in the direction away from the secondary telescopic platform 32, and meanwhile, the second chain 342 changes as the shape of the primary telescopic platform 31 changes. When the secondary telescopic platform 32 moves in the direction facing the submount 33, the primary telescopic platform 31 also needs to move with the secondary telescopic platform 32. Meanwhile, the primary telescopic platform 31 is pulled by the second chain 342 so that the primary telescopic platform 31 retracts in the direction facing the secondary telescopic platform 32, and meanwhile, the first chain 341 and the second chain 342 are reset.

In this embodiment, the first axle 321 and the second axle 322 are both sprockets to achieve the synchronous rotary between the chains and the sprockets to prevent slippage, noise and equipment wear. The number of first chains 341 is two, the number of second chains 342 is two, the number of first axles 321 is two, and the number of second axles 322 is two. In this embodiment, two sets of first chains 341 and two sets of first axles 321 are located in the middle of the secondary telescopic platform 32, and two sets of second chains 342 and two sets of second axles 322 are symmetrically disposed on two sides of the first chains 341 to improve the driving stability of the double-speed telescopic assembly 34.

Figure 12:
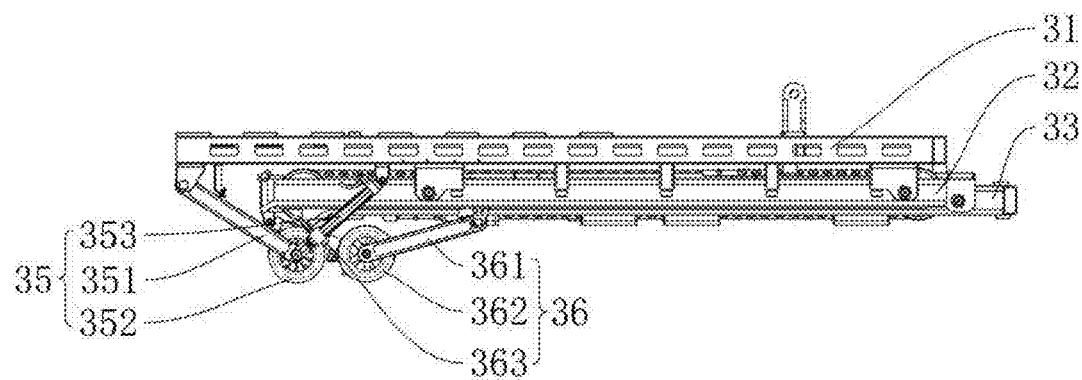
FIG. 12 is a front view of a telescopic platform device according to an embodiment of the present application.

After the telescopic platform device 3 extends, the feeding device 1 is mounted on the upper part of the primary telescopic platform 31, and the primary telescopic platform 31 and the secondary telescopic platform 32 have the risk of bending downward due to the influence of gravity, As shown in FIG. 12, the first landing gear assembly 35 is disposed at the bottom of a second end of the primary telescopic platform 31, and the first landing gear assembly 35 includes a first connecting rod 351, a first roller 352 and a third driving member 353, where one end of the first connecting rod 351 is hinged to the end portion of the second end of the primary telescopic platform 31, and the other end of the first connecting rod 351 is mounted with the first roller 352, the third driving member 353 is mounted on the bottom of the primary telescopic platform 31, the output end of the third driving member 353 is drivingly connected to one end of the first connecting rod 351 closing to the first roller 352, the third driving member 353 is configured to drive the first connecting rod 351 to rotate around the primary telescopic platform 31 to support the primary telescopic platform 31. Therefore, when the primary telescopic platform 31 extends, the third driving member 353 drives the first connecting rod 351 to rotate around the primary telescopic platform 31 to make the first roller 352 disposed on the step to make the first roller 352 and the first connecting rod 351 together support the primary telescopic platform 31, thereby preventing the primary telescopic platform 31 from bending downward under the gravity of the primary telescopic platform 31 itself and the feeding device 1, and improving the service life of the palletizer. The first landing gear assembly 35 is disposed at the bottom of the second end of the primary telescopic platform 31.

The second landing gear assembly 36 is disposed at the bottom of the second end of the secondary telescopic platform 32. The second landing gear assembly 36 has the same structure as the first landing gear assembly 35. The secondary telescopic platform 32 includes a second connecting rod 361, a second roller 362 and a fourth driving member 363, where one end of the second connecting rod 361 is hinged to the bottom of the secondary telescopic platform 32, the second roller 362 is mounted on the other end of the second connecting rod 361, the fourth driving member 363 is mounted at the end portion of the second end of the secondary telescopic platform 32, the output end of the fourth driving member 363 is drivingly connected to one end of the second connecting rod 361 closing to the second roller 362, and the fourth driving member 363 is configured to drive the second connecting rod 361 to rotate around the secondary telescopic platform 32 to support the secondary telescopic platform 32. When the secondary telescopic platform 32 extends, the fourth driving member 363 drives the second connecting rod 361 to rotate around the secondary telescopic platform 32 to make the second roller 362 disposed on the step to make the second roller 362 and the second connecting rod 361 together support the secondary telescopic platform 32, thereby preventing the secondary telescopic platform 32 from bending downward under the gravity of the secondary telescopic platform 32 itself, the primary telescopic platform 31, the feeding device 1, and the materials, and improving the service life of the palletizer. The second landing gear assembly 36 is disposed on each of two sides of the bottom of the second end of the secondary telescopic platform 32. In this embodiment, the third driving member 353 and the fourth driving member 363 are each oil cylinders.

To prevent the deformation of the telescopic platform device 3 and to improve the palletizing quality of the feeding device 1, the primary telescopic platform 31 carrying the feeding device 1 needs to keep parallelism with the submount 33 after extending or retracting. In this embodiment, the calibration assembly is a reference of depth of parallelism of the primary telescopic platform 31 after the primary telescopic platform is adjusted to extend or retract relative to the submount 33. The calibration assembly includes a first gyroscope and a second gyroscope, where the first gyroscope is mounted on the first telescopic platform 31, and the second gyroscope is mounted on the submount 33. The driving distance between the third driving member 353 and the fourth driving member 363 is adjusted by data of the first gyroscope and the second gyroscope so that depth of parallelism of the primary telescopic platform 31 and the submount 33 is adjusted to prevent the deformation of the telescopic platform device 3, improve the service life of the device, and improve the palletizing quality.

A first displacement sensor is also disposed on the telescopic platform device 3, the first displacement sensor enables an accurate displacement of the primary telescopic platform 31 relative to the submount 33.

Figure 13:
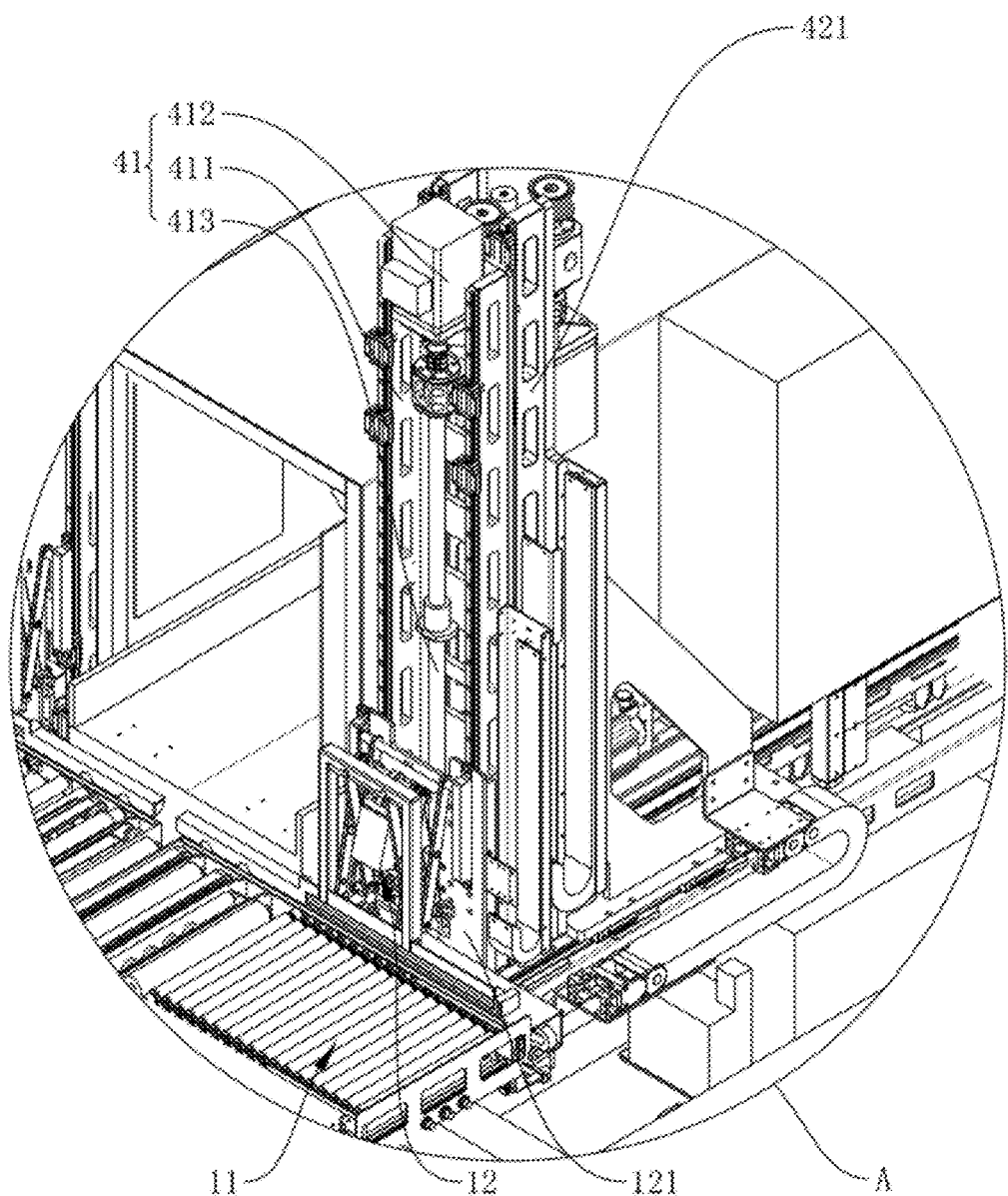
FIG. 13 is an enlarged view of part A of FIG. 2.
Figure 14:
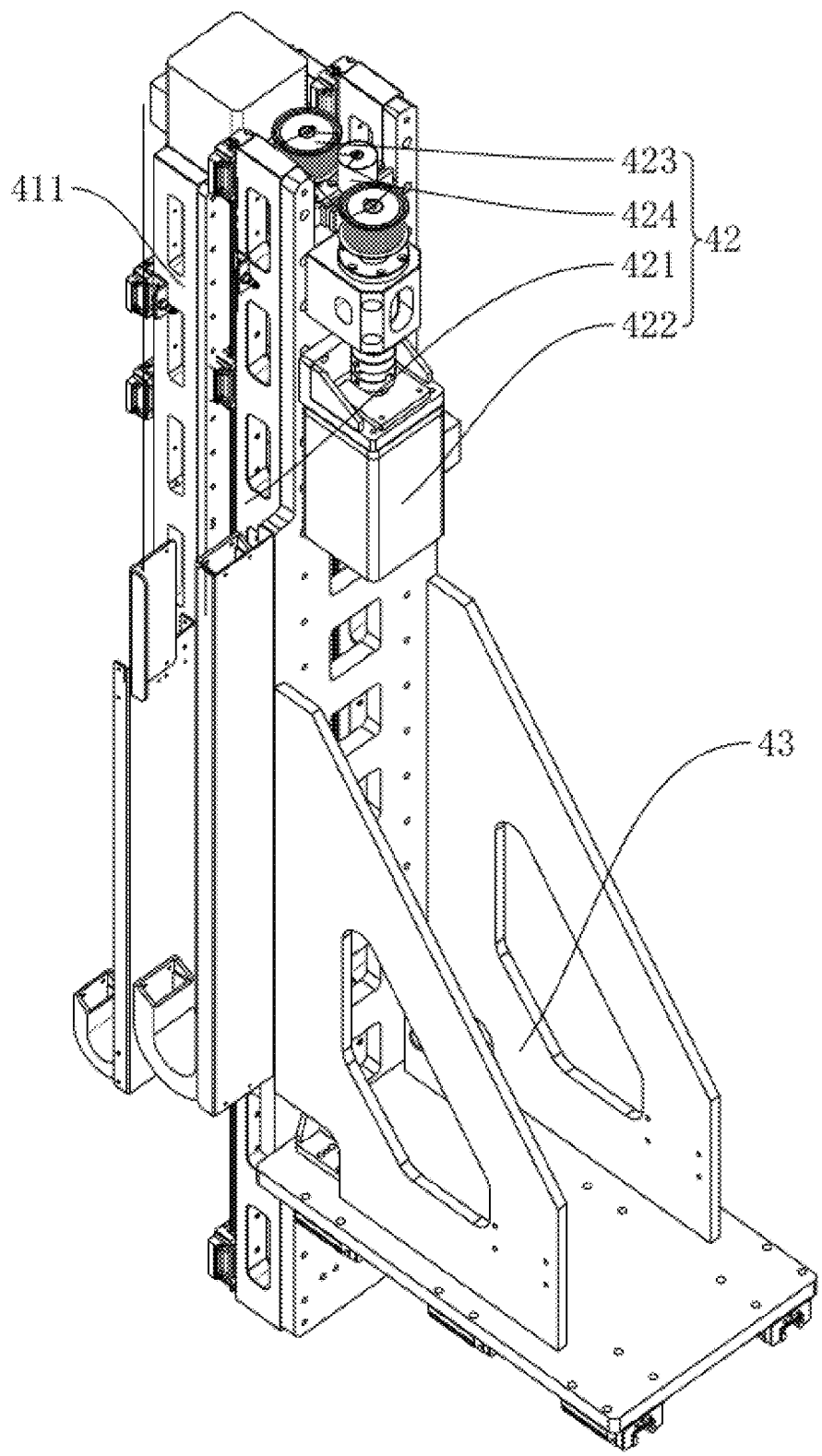
FIG. 14 is a structure view of a multi-stage telescopic device according to an embodiment of the present application.

As shown in FIGS. 13 and 14, each of the multi-stage lifting devices 4 includes a primary lifting mechanism 41 and a secondary lifting mechanism 42, the feeding device 1 is mounted on the primary lifting mechanism 41, the primary lifting mechanism 41 is configured to drive the feeding device 1 up and down, the primary lifting mechanism 41 is mounted on the secondary lifting mechanism 42, and the secondary lifting mechanism 42 is configured to drive the primary lifting mechanism 41 up and down.

In this embodiment, the primary lifting mechanism 41 and the secondary lifting mechanism 42 each use lead screw drives, the primary lifting mechanism 41 includes a first bracket 411, a second driving motor 412 and a first lead screw 413. The first bracket 411 is vertically disposed, the first lead screw 413 is mounted on the first bracket 411, the second driving motor 412 is disposed on the top end of the first bracket 411, and the first lead screw 413 is drivingly connected to the second driving motor 412. A first connecting block is disposed on one side of the fixed plate 121 away from the push plate mechanism 12, is provided with a built-in threaded hole, and is drivingly connected to the first lead screw 413, second slide rails are provided on the first bracket 411 and on two sides of the first lead screw 413, first slide grooves 1141 matched with the second slide rails are also provided on one side of the fixed plate 121 away from the push plate mechanism 12, and the first slide grooves 1141 are slidably connected to the second slide rails to increase the lifting stability of the fixed plate 121. When the second driving motor 412 drives the first lead screw 413 to rotate, the fixed plate 121 carries the feeding device 1 to lift on the first lead screw 413 along the second slide rails.

The secondary lifting mechanism 42 includes a second bracket 421, a third driving motor 422, a second lead screw 423, and a first synchronous belt 424. A second bracket 421 is vertically disposed, a third driving motor 422 is disposed on the top end of the second bracket 421, the second lead screw 423 is mounted on the second bracket 421, the third driving motor 422 is drivingly connected to the second lead screw 423 through the first synchronous belt 424, a second connecting block is disposed on one side of the first bracket 411 away from the fixed plate 121, is provided with a built-in threaded hole, and is drivingly connected to the second lead screw 423, third slide rails are provided on the second bracket 431 and on two sides of the second lead screw 423, multiple second sliders matched with the third slide rails are also provided on one side of the first bracket 411 away from the fixed plate 121, and the second sliders are slidably connected to the third slide rails to increase the stability of the primary lifting mechanism 41. When the third driving motor 422 drives the second lead screw 423 to rotate, the primary lifting mechanism 41 carries the feeding device 1 on the second lead screw 423 to perform a secondary lifting along the third slide rails.

The secondary lifting mechanism 42 is secured to a fixed seat 43 that is slidably mounted on the primary telescopic platform 31, and the multi-stage lifting device 4 is slidably mounted on the primary telescopic platform 31 to finely adjust the position of the feeding device 1 when the state of the telescopic platform device 3 is unchanged.

The above structure achieves the multi-stage lifting of the feeding device 1 and the feed diverting device 2. A second displacement sensor is also disposed on the multi-stage lifting device 4 to achieve the full-flexible automatic positioning of different heights of the feeding device 1 and the feed diverting device 2.

The walking device 5 includes a chassis 51 and a movement mechanism 52. The chassis 51 is mounted on the movement mechanism 52, and the submount 33 of the telescopic platform device 3 is secured to the chassis 51. In this embodiment, the movement mechanism 52 is a track-type driven structure. The movement mechanism 52 includes two tracks that are mounted on two sides of the chassis 51, respectively to achieve the movement of the palletizer. In other embodiments, the movement mechanism 52 may also be a wheel driven structure. The movement mechanism 52 includes four wheels that are uniformly mounted on two sides of the chassis 51 to achieve the movement of the palletizer.

To palletize the materials to positions of different heights, the logistics palletizing system also includes a hydraulic lifting platform 10 on which the palletizer is disposed to be driven by the hydraulic lifting platform 10 up and down, and the walking device 5 can walk on the hydraulic lifting platform 10. According to this arrangement, the palletizer not only can be adjusted to different heights to adapt to the material palletizing platform of different heights (for example, dock to tracks of different heights), but also can walk on the hydraulic lifting platform 10 through the walking device 5 to finely adjust the logistics palletizing position, thereby accurately palletizing the materials.

This embodiment also provides the working process of the above palletizer.

For example, when the palletizer is applied to the gooseneck truck, the palletizer is first moved into the gooseneck truck, the width of the pallet mechanism is first adjusted through position sensor 1131 to satisfy the maximum allowable width, and meanwhile, the width of the second push bar 1233 increases as the width of the pallet mechanism increases. When it is needed to place the materials on the gooseneck platform, the telescopic platform device 3 extends, meanwhile, the first landing gear assembly 35 and the second landing gear assembly 36 both support the primary telescopic platform 31 and the secondary telescopic platform 32, the feed diverting device 2 conveys the materials to the feeding devices 1 on two sides, and the feeding devices 1 palletize the materials. The feeding devices 1 fit with the multi-stage lifting devices 4 to achieve the multi-stage palletizing of the materials and increase the maximum allowable palletizing height. When the materials on the gooseneck platform have been palletized, the telescopic platform device 3 is reset, and the feed diverting device 2 and the feeding devices 1 continue to fit with the multi-stage lifting devices 4 to palletize the materials in the container. After the materials have been palletized, the palletizer is moved out of the container.

Figure 16:
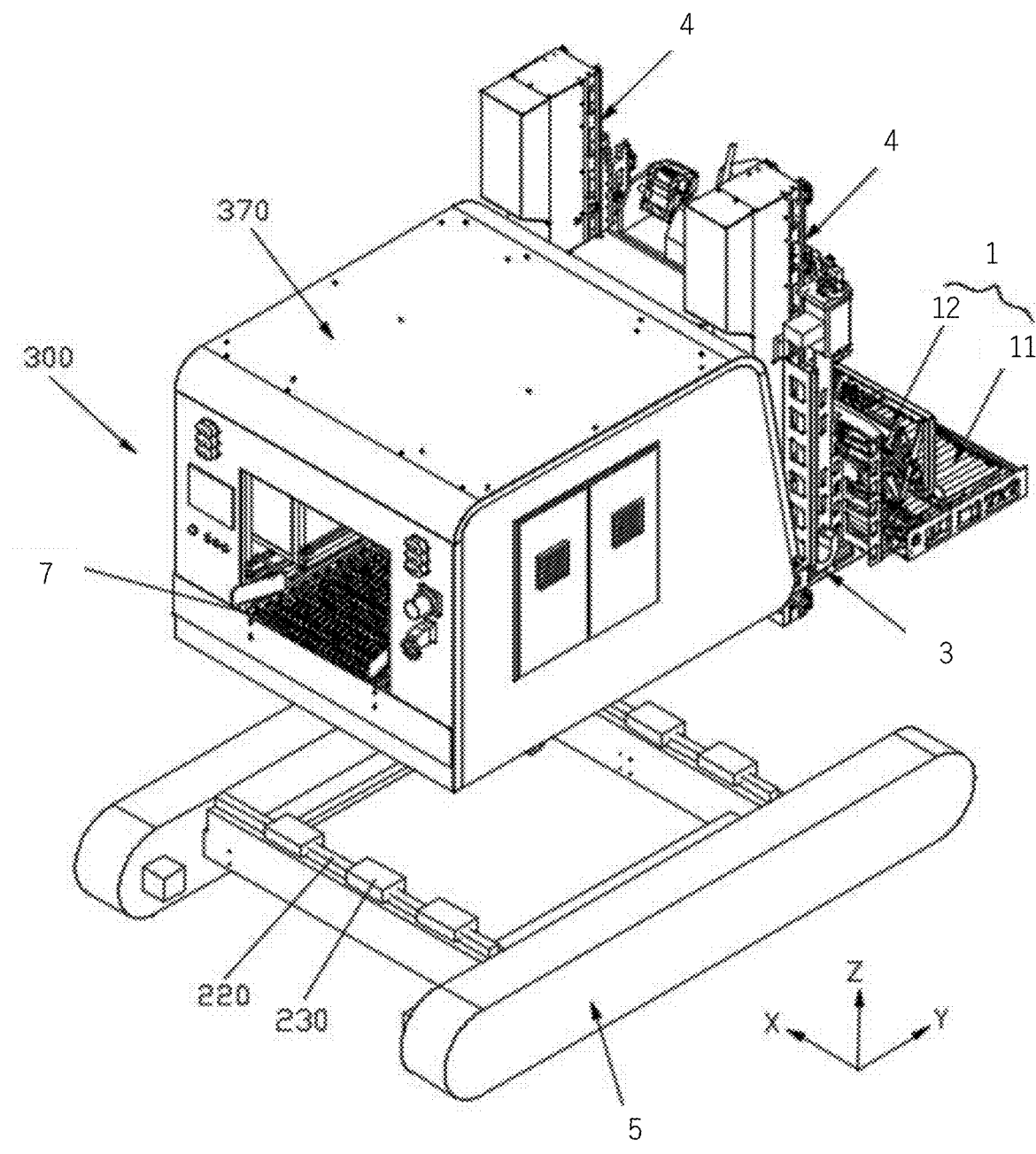
FIG. 16 is an exploded view of a palletizer according to an embodiment of the present application.
Figure 17:
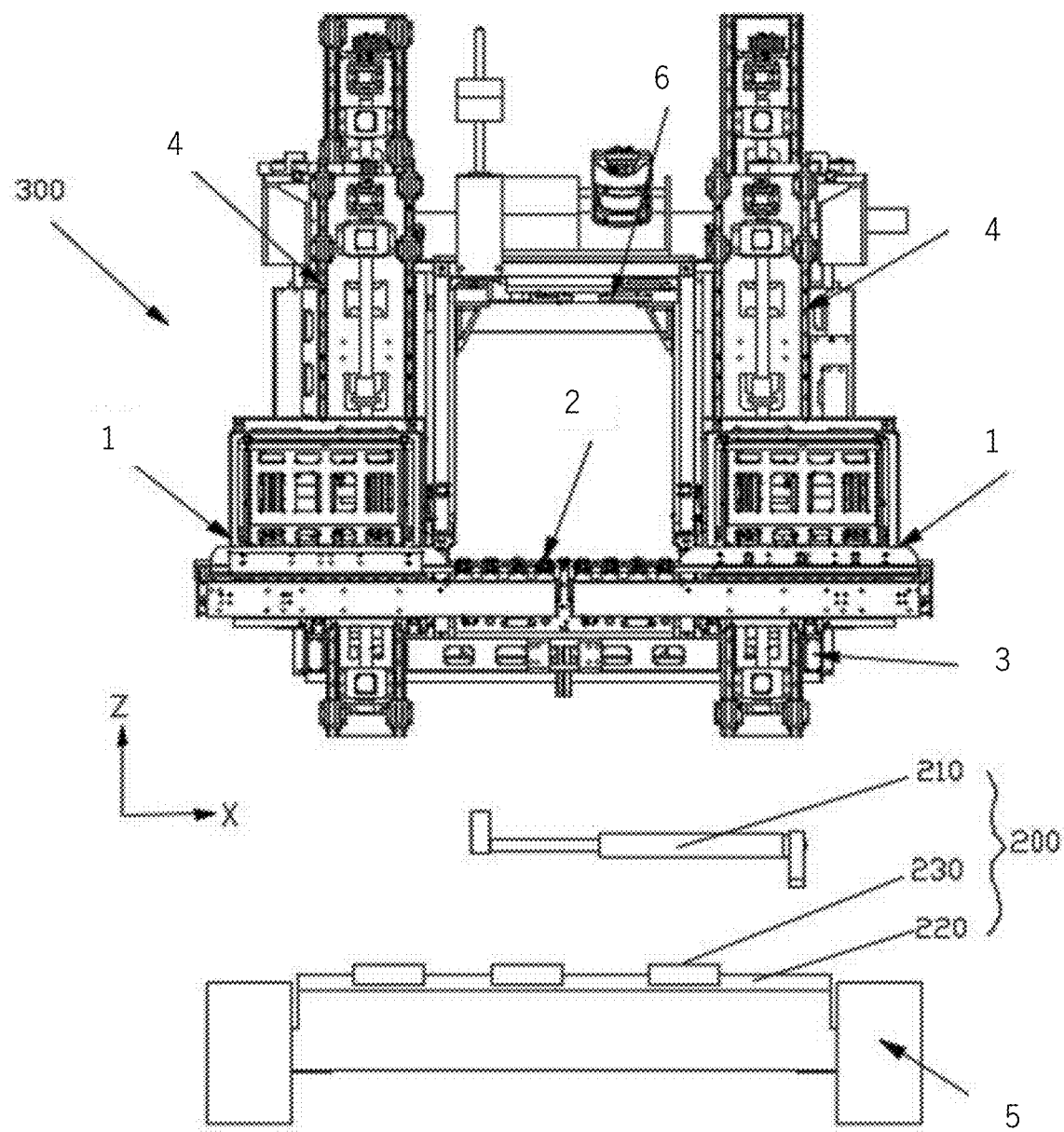
FIG. 17 is an exploded view of another palletizer according to an embodiment of the present application.

The embodiments of the present application also provide a palletizer. Referring to FIGS. 15 to 20, the palletizer includes a translation device 200 and a conveyor belt 7 in addition to the feeding devices 1, the feed diverting device 2, the telescopic platform devices 3, the multi-stage lifting devices 4 and the walking devices 5. The walking device 5 may be a track-type walking structure. The translation device 200 is disposed on the walking devices 5, and the feeding devices 1, the feed diverting device 2, the telescopic platform devices 3, the multi-stage lifting devices 4, and the conveyor belt 7 constitute a body portion 300 of the palletizer. The body portion 300 is disposed above the translation device 200 and is connected to the output end of the translation device 200 to make the translation device 200 push the body portion 300 to move in the X direction to adapt to the interval control during the palletizing. X direction is the width direction of the palletizer and may also be called as a lateral direction or a left and right direction. In FIG. 17, the translation device 200 is a cylinder. In other embodiments, the translation device 200 may be another mechanism provided that this mechanism can push the body portion 300 to move laterally.

The above structure improvement of disposing the translation device 200 on the palletizer is an improvement made according to the on-site requirements during the palletizing. Such improvement solves the problem that the palletizer cannot adapt to the interval control of the materials in the container since the palletizer can only move forward and backward in the length direction of the palletizer or move up and down in the height direction of the palletizer and cannot move laterally in the width direction. In the present application, the translation device 200 pushes the body portion 300 of the palletizer to move laterally so that the gap control of the materials in the container during the automatic loading is achieved.

Referring to FIGS. 15 to 20, the telescopic platform device 3 and the conveyor belt 7 are each connected to the output end of the translation device 200, and the translation device 200 drives the telescopic platform device 3 and the conveyor belt 7 to move in the X direction. The feed diverting device 2 and the multi-stage lifting device 4 are each connected to the output end of the telescopic platform device 3, and the telescopic platform device 3 drives the feed diverting device 2 and the multi-stage lifting device 4 to move in a Y direction. Y direction is the length direction of the palletizer and may also be called as a longitudinal direction or a front and rear direction. The feeding device 1 is mounted on the output end of the multi-stage lifting device 4, and the multi-stage lifting device 4 can drive the feeding device 1 to move in a Z direction. Z direction is the height direction of the automatic palletizer and may be called as a vertical direction or an up and down direction.

The conveyor belt 7 and the feed diverting device 2 are located on the same straight line in the conveying direction. The conveyor belt 7 conveys the materials to the feed diverting device 2. The feeding devices 1 are disposed on two sides of the feed diverting device 2. The feed diverting device 2 diverts the materials to the feeding devices 1 on two sides. The multi-stage lifting device 4 can drive the feed diverting device 2 and the feeding device 1 to move up and down as a whole to adapt to the palletizing height. The telescopic platform device 3 drives the multi-stage lifting device 4 to move back and forth. The multi-stage lifting device 4 moves back and forth together with the feed diverting device 2 and the feeding device 1 mounted on the multi-stage lifting device 4 to achieve the extension and retraction and place the materials on the piles. The push plate mechanism 12 is disposed on the feeding device 1 to push the materials on the feeding device 1 onto the piles.

Figure 15:
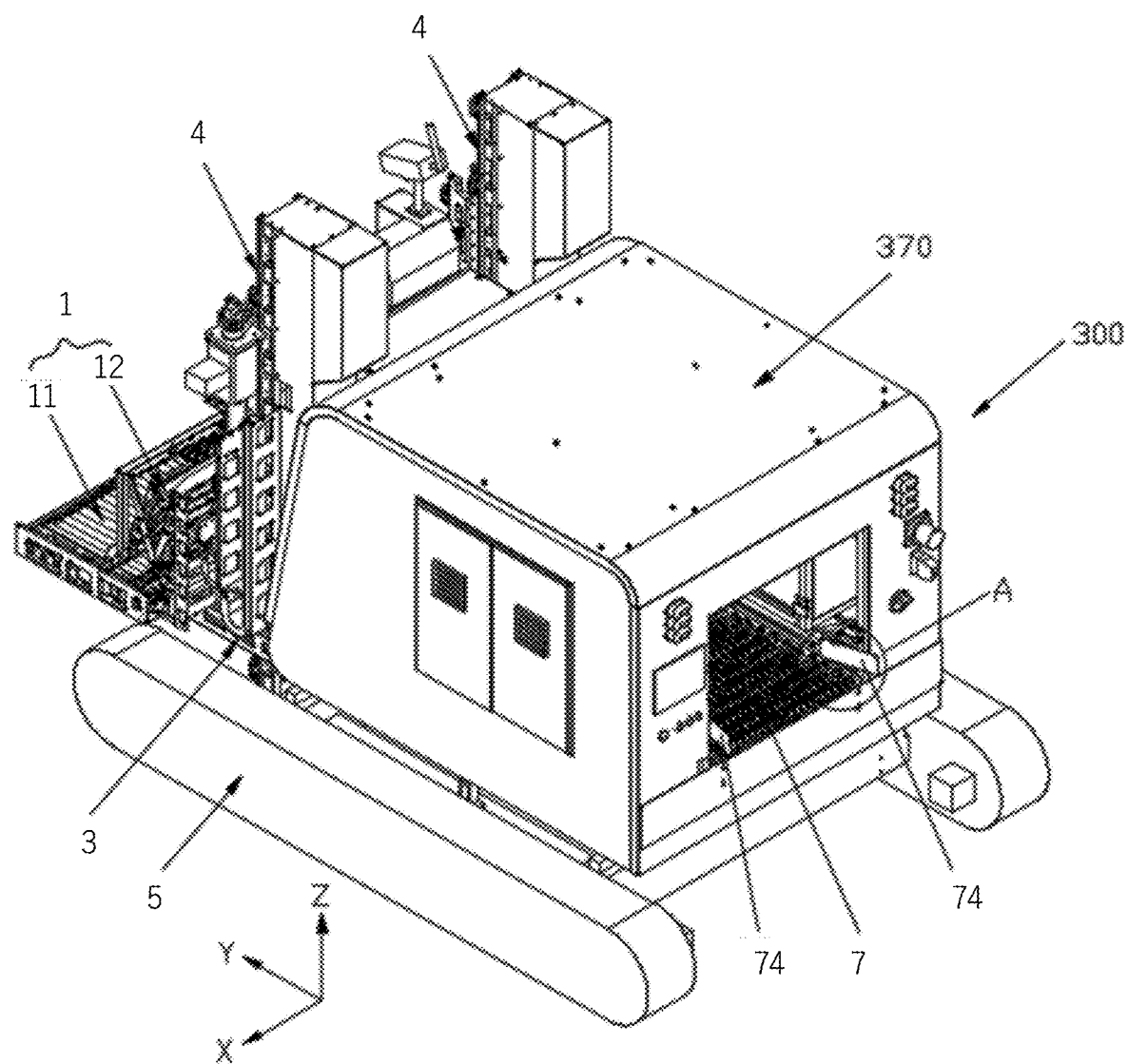
FIG. 15 is a structure view of another palletizer according to an embodiment of the present application.

As shown in FIG. 15, the feeding device 1 includes the pallet mechanism 11 and the push plate mechanism 12. The pallet mechanism 11 is configured to hold up the materials. The feed diverting device 2 diverts the materials to pallet mechanisms 11. The push plate mechanism 12 is located on one side of the pallet mechanism 11 closing to the multi-stage lifting device 4 in the Y direction and can extend and retract in the Y direction to push the materials to fall from one side of the pallet mechanism 11 away from the multi-stage lifting device 4 in the Y direction. The push plate mechanism 12 may be a scissor telescopic structure that is driven to extend and retract through a driving member.

Figure 18:
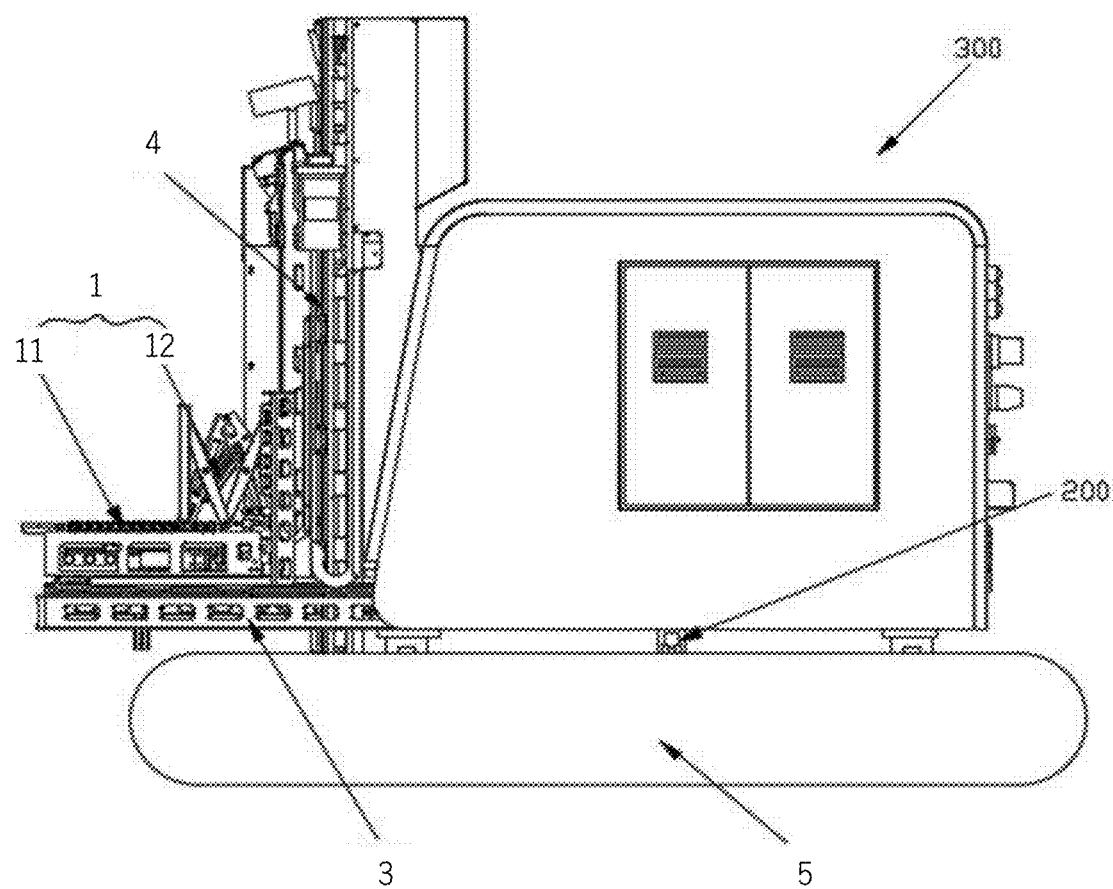
FIG. 18 is a side structure view of a palletizer according to an embodiment of the present application.

In one embodiment, as shown in FIGS. 17 and 18, the translation device 200 includes a translation cylinder 210. The translation cylinder 210 is horizontally disposed in the X direction. The main body of the translation cylinder 210 is fixedly mounted on the walking device 5, and a piston of the translation cylinder 210 is connected to the body portion 300 of the palletizer. The piston of the translation cylinder 210 extends and retracts to drive the body portion 300 of the palletizer to move left and right in the X direction to control the interval between the materials. The translation cylinder 210 may be replaced with another linear driving mechanism, for example, a structure in which a motor is matched with lead screw nuts, and is not limited here. To improve the movement stability of the body portion 300, as shown in FIG. 16, the translation device 200 also includes first slide rails 220 and first sliders 230. The first slide rails 220 are fixed to the walking devices 5 and are disposed in the X direction to make the body portion 300 move along the first slide rails 220 in the X direction. The first sliders 230 are slidably fitted with the first slide rails 220, and the body portion 300 is secured to the first sliders 230. The first sliders 230 fit with the first slide rails 220 to guide the body portion 300 to move so that the body portion 300 can move more smoothly.

Two first slide rails 220 are provided and are disposed in parallel, and a certain interval is provided between the two first slide rails 220. Multiple first sliders 230 are disposed on each of the first sliders 220, and the body portion 300 is secured to the multiple first sliders 230 so that the support strength of the first sliders 230 to the body portion 300 can be improved. In FIG. 17, two first slide rails 220 are provided, and three first sliders 230 are disposed on each of the first slide rails 220. In other embodiments, the number of first slide rails 220 and the number of first sliders 230 can be adjusted as needed, and are not limited herein.

Figure 19:
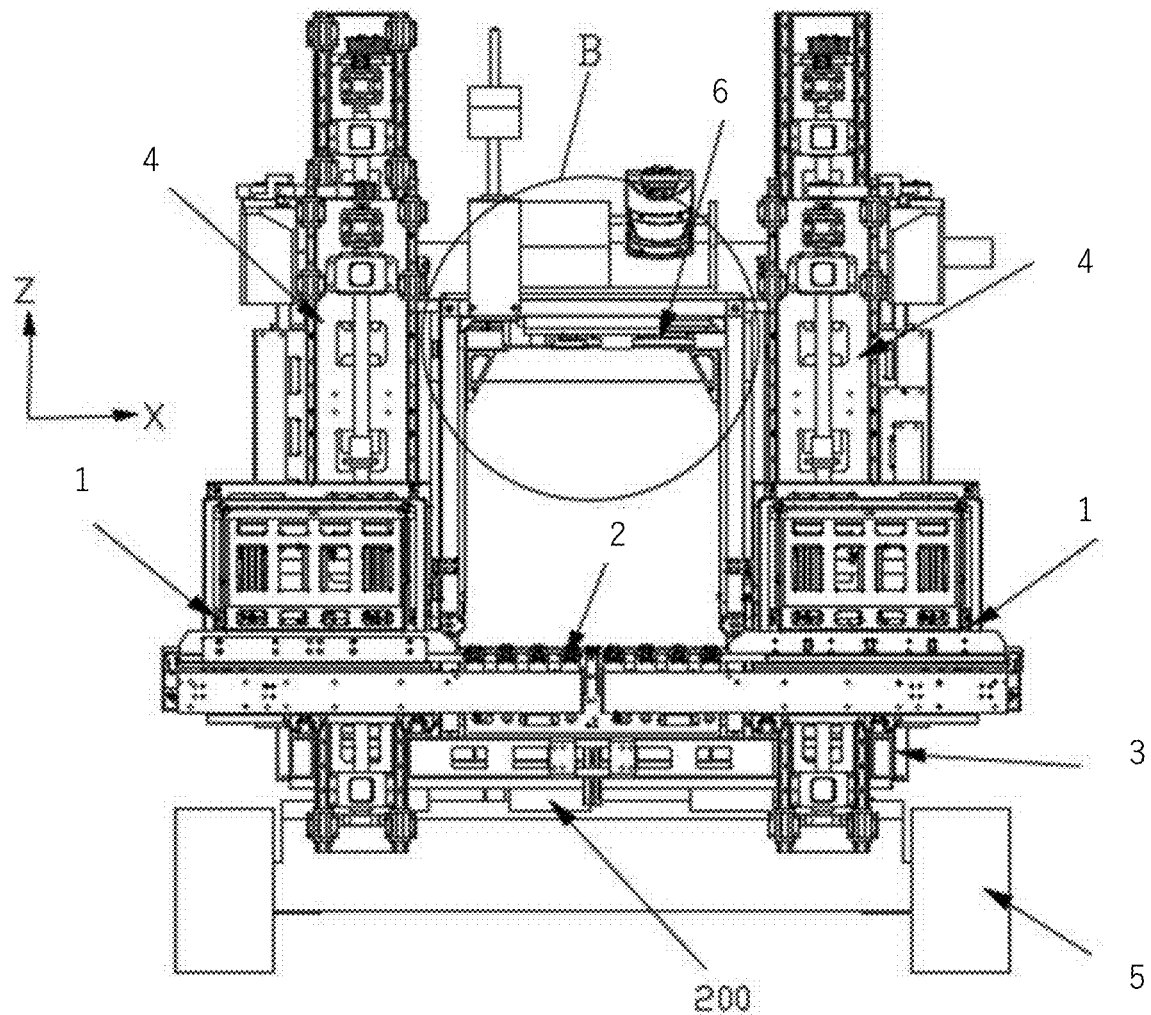
FIG. 19 is a front structure view of a palletizer according to an embodiment of the present application.
Figure 20:
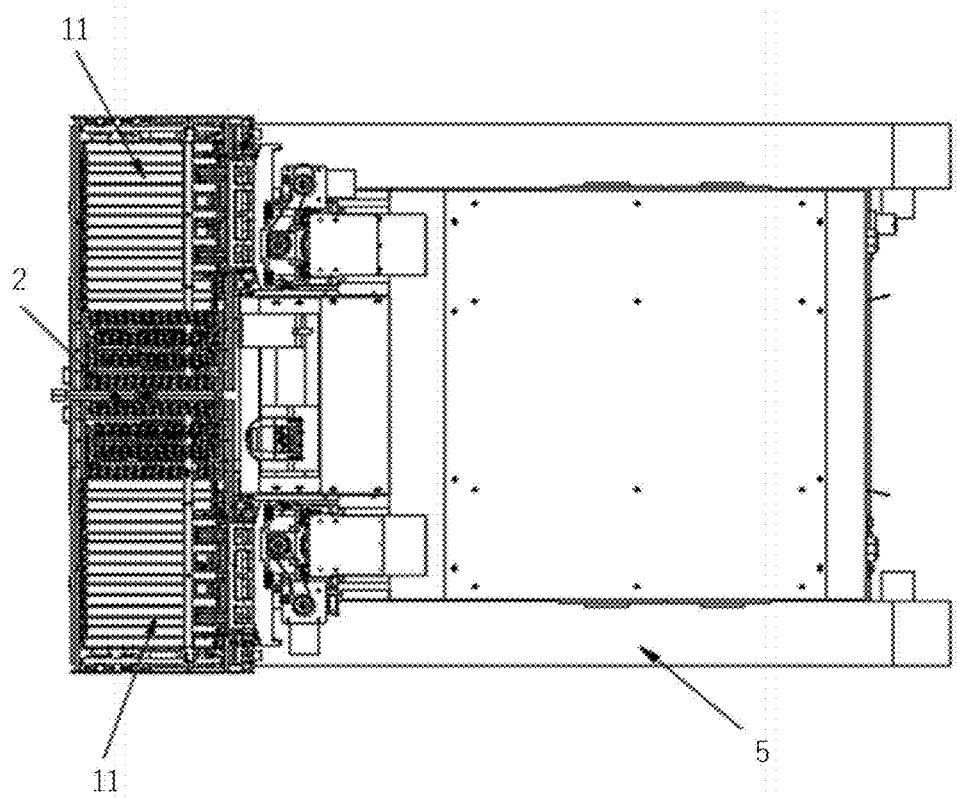
FIG. 20 is a top structure view of a palletizer according to an embodiment of the present application.
Figure 22:
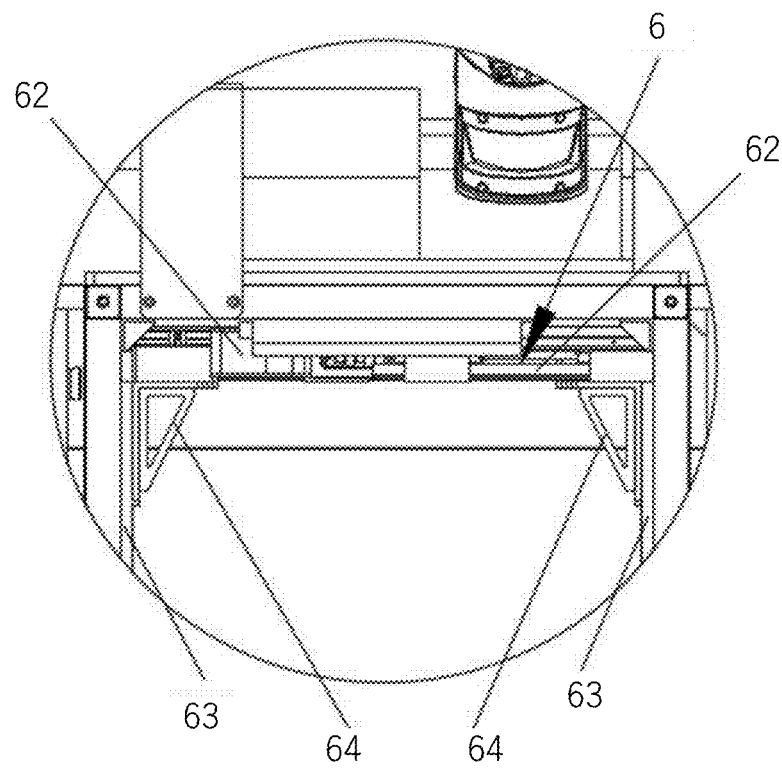
FIG. 22 is an enlarged view of part B of FIG. 19.

In one embodiment, as shown in FIGS. 19 and 22, the body portion 300 also includes the regularized device 6. The regularized device 6 is disposed above the conveyor belt 7 and is configured to regulated and position the materials on the conveyor belt 7. The materials on the conveyor belt 7 may move to two sides of the conveyor belt 7 in the conveying process. The regularized device 6 gathers the materials on the conveyor belt 7 to the middle, so as to prevent the materials from moving to two sides of the conveyor belt 7.

Referring to FIGS. 19 and 22, the regularized device 6 includes two servomotors 62 and two regularized plates 63. The two servomotors 62 are substantially left and right symmetrically disposed in the X direction. An output end of each servo motor 62 is connected to one regularized plate 63, and the two servo motors 62 can drive the two regularized plates 63 close to each other so that the materials are gathered in the middle of the conveyor belt 7. As shown in FIG. 22, a triangular reinforcing plate 64 is disposed on the top of the regularized plate 63. The top of the regularized plate 63 is a right triangle. Two adjacent sides of the triangular reinforcing plate 64 are connected to two right-angled sides of the regularized plate 63. The triangular reinforcing plate 64 can prevent the regularized plate 63 from deformation. The triangular reinforcing plate 64 may be a hollow structure that can reduce weight and save materials.

Figure 21:
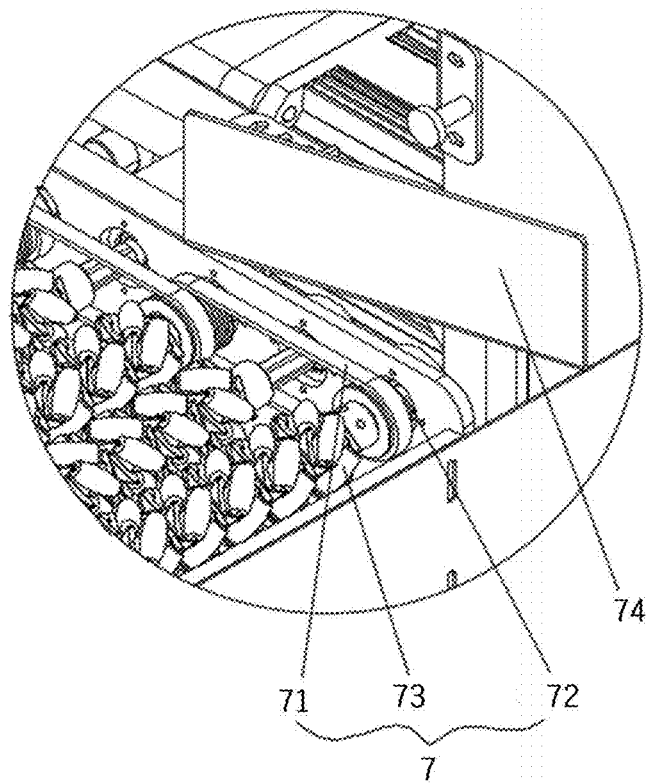
FIG. 21 is an enlarged view of part A of FIG. 15.

Referring to FIGS. 15 and 21, the conveyor belt 7 includes a fifth driving member, multiple synchronous belts 71, multiple second rotary shafts 72 and multiple second Mecanum wheels 73 sleeved on each of the multiple second rotary shafts 72. The fifth driving member is configured to drive the second rotary shafts 72 to rotate. The multiple second rotary shafts 72 are disposed in the Y direction in sequence so that the conveyer belt 7 conveys the materials in the Y direction. The fifth driving member is connected to one second rotary shaft 72 of the multiple second rotary shafts 72 to make the fifth driving member drive the second rotary shaft 72 to rotate. Torque is transmitted among the multiple second rotary shafts 72 through the multiple synchronous belts 71. Two ends of each synchronous belt 71 are sleeved on two second rotary shaft 72, respectively so that all second rotary shafts 72 can be driven to rotate through one fifth driving member. A second synchronous belt is disposed on the second rotary shaft 72, and the synchronous belt 71 is sleeved on the second synchronous belt. Multiple second Mecanum wheels 73 are sleeved on the second rotary shaft 72. The multiple second Mecanum wheels 73 synchronously rotate with the second rotary shaft 72.

In one embodiment, as shown in FIG. 15, the palletizer also includes a housing 370, where the housing 370 covers the conveyor belt 7, and the housing 370 is configured to protect the conveyor belt 7, preventing foreign objects from falling onto the conveyor belt 7, and meanwhile, ensuring the safety in the conveying process.

As shown in FIG. 15, two guide plates 74 are disposed at the inlet end of the conveyor belt 7, the two guide plates 74 form one flared opening to guide the materials flowing into the conveyor belt 7 so that the materials can more easily enter the conveyor belt 7.

As shown in FIGS. 23 to 28, the posture adjustment mechanism 8 includes a rack 81 fixedly disposed on a working platform to secure and support the whole posture adjustment mechanism 8.

Optionally, the rolling portion 821 is a roller, two ends of the roller are rotatably inserted in the rack 81 through the rotary shaft, and multiple rollers are arranged at intervals on the rack 81 to form a conveying platform for the materials and are highly reliable. A gap is formed between each two adjacent rollers to give way to the turnover assembly 83. In other embodiments, the rolling portion 821 may be configured as a conveyor roller structure and is not limited in this embodiment.

The movement assembly 82 also includes a movement driving portion 822 that is drivingly connected to the rolling portion 821 to drive the rolling portion 821 to rotate, thereby achieving the automatic conveying of the materials. The movement driving portion 822 includes a second conveyor belt and a fourth driving motor, where the second conveyor belt is drivingly connected to the multiple rolling portions 821, the fourth driving motor is drivingly connected to the second conveyor belt to drive the second conveyor belt to move, and the second conveyor belt drives the rolling portions 821 to rotate to convey the materials. For example, the second conveyor belt connects the multiple rolling portions 821 in series, and the fourth driving motor is drivingly connected to the second conveyor belt located at the end of the series so that the multiple rolling portions 821 are driven to synchronously rotate by one fourth driving motor, thereby ensuring the conveying stability of the materials. In other embodiments, the number of second conveyor belts and the number of fourth driving motors may be set according to the length of the arrangement of the rolling portions 821 and are not limited in this embodiment.

Figure 24:
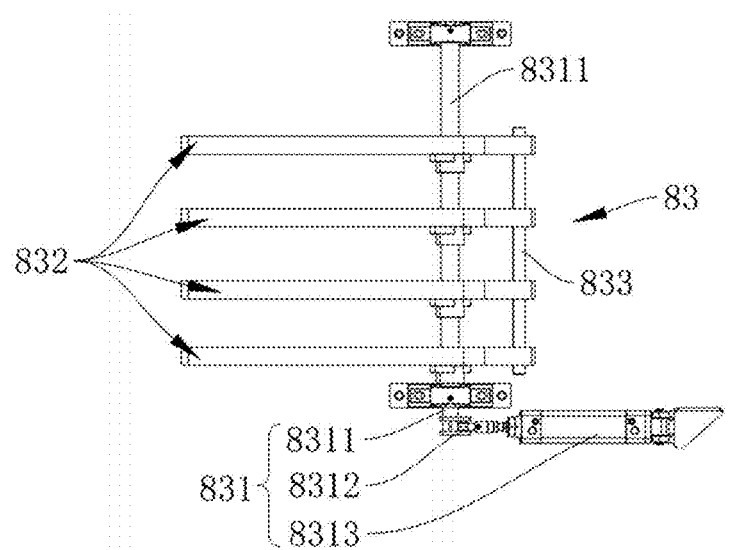
FIG. 24 is a structure view of a turnover assembly in a posture adjustment mechanism according to an embodiment of the present application.
Figure 25:
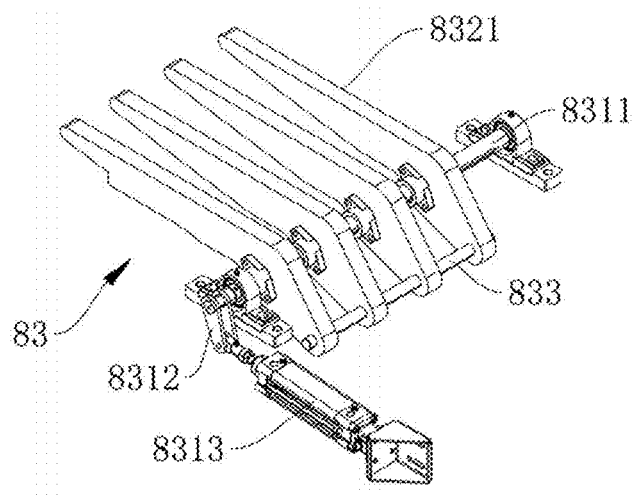
FIG. 25 is a structure view of a turnover assembly in another posture adjustment mechanism according to an embodiment of the present application.

As shown in FIGS. 24 and 25, in the solutions of the posture adjustment mechanism 8, the driving portion 831 includes a first rotary shaft 8311, a hinge 8312, and a first telescopic cylinder 8313. The first rotary shaft 8311 is fixedly connected to the turnover portion 832, the hinge 8312 is fixedly connected to the first rotary shaft 8311, the output end of the first telescopic cylinder 8313 is hinged to the hinge 8312 and the first telescopic cylinder 8313 can drive the hinge 8312 to rotate, so as to drive the first rotary shaft 8311 to rotate, thereby driving the turnover portion 832 to rotate to perform the abutment rotation on the materials and achieve the posture adjustment.

Optionally, two ends of the first rotary shaft 8311 are rotatably mounted on the rack 81 through a rolling bearing. Moreover, one end of the first rotary shaft 8311 extends out of the rolling bearing and the extended end is a rectangular structure.

The hinge 8312 is a second linkage. One end of the hinge 8312 is provided with a rectangular insertion hole, and the rectangular structure on the first rotary shaft 8311 is fixedly inserted in the rectangular insertion hole so that the hinge 8312 is fixedly connected to the first rotary shaft 8311, having high reliability. In other embodiments, a prism structure such as a triangular prism or a pentagonal prism may be provided on the first rotary shaft 8311, and a corresponding prism insertion hole is provided on the hinge 8312 so that the insertion and fixing of the prism structure and the corresponding prism insertion hole is achieved, and is not limited in this embodiment.

The first telescopic cylinder 8313 is hinged to the other end of the hinge 8312 and the first telescopic cylinder 8313 telescopically moves to drive the first rotary shaft 8311 connected to the hinge 8312. The first telescopic cylinder 8313 is rotatably connected to the rack 81 through a hinge seat.

In the solutions of the posture adjustment mechanism 8, the turnover portion 832 includes multiple turnover pawls 8321 that are equally spaced on the first rotary shaft 8311 so that the materials are subjected to the uniform force. Moreover, each turnover pawl 8321 corresponds to one gap to increase the abutment area of the material and improve the rotary stability of the material. For example, each turnover pawl 8321 is fixedly sleeved on the periphery of the first rotary shaft 8311. In other embodiments, the turnover pawl 8321 may also be welded to the first rotary shaft 8311 and is not limited in this embodiment.

To enhance the rotary and connection stability of the multiple turnover pawls 8321, the turnover assembly 83 also includes a connector 833, where the connector 833 is fixedly connected to the multiple turnover pawls 8321. For example, the connector 833 extends through multiple turnover pawls 8321 and is simultaneously fixedly connected to the multiple turnover pawls 8321. In other embodiments, the connector 833 and the multiple turnover pawls 8321 may be fixed in other forms, and is not limited in this embodiment.

In the solutions of the posture adjustment mechanism 8, the posture adjustment mechanism 8 also includes a first stop assembly 84, where the first stop assembly 84 is mounted on the rack 81, and the first stop assembly 84 can extend through the gaps and stop the materials, preventing the collision between the materials from interfering with the material posture adjustment.

Figure 26:
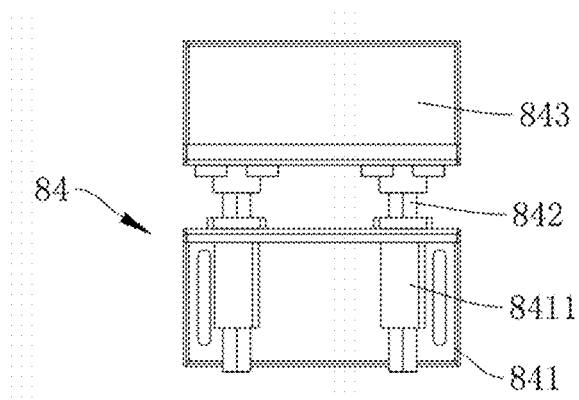
FIG. 26 is a structure view of a first stop assembly in a posture adjustment mechanism according to an embodiment of the present application.
Figure 27:
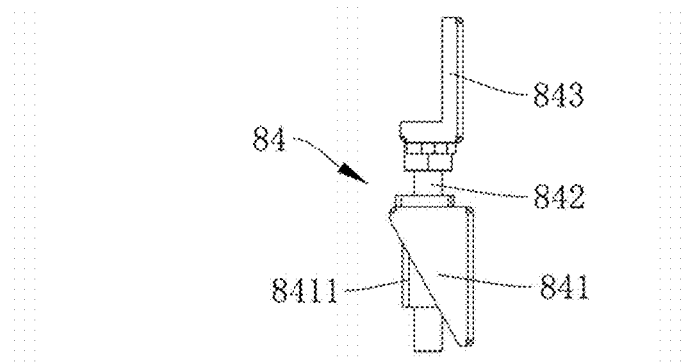
FIG. 27 is a structure view of a first stop assembly in another posture adjustment mechanism according to an embodiment of the present application.

Optionally, as shown in FIGS. 26 and 27, the first stop assembly 84 includes a base 841, an elastic connector 842 and a stop 843, where the base 841 is fixedly mounted on the rack 81, the elastic connector 842 is connected to the base 841, the stop 843 is fixedly connected to the elastic connector 842, the stop 843 extends through the gaps to stop the materials, and the stop 843 can abut the turnover portion 832.

For example, a fixed sleeve 8411 is disposed on the base 841. Two fixed sleeves 8411 are provided. The two fixed sleeves 8411 are spaced apart.

The elastic connector 842 includes a spring and a socket, where the socket is movably sleeved in the fixed sleeve 8411, and the spring is disposed in the fixed sleeve 8411 and is fixedly connected to the socket and the fixed sleeve 8411 to limit the expansion and retraction of the spring and prevent deviation. Accordingly, two springs and two sockets are provided. Two springs and two sockets are in a one-to-one correspondence with the two fixed sleeves 8411 to ensure the connection stability of the first stop assembly 84. In other embodiments, the spring may also be directly connected to the stop 843 and the base 841 in the elastic connector 842 and is not limited in this embodiment.

The stop 843 is provided with an abutment portion, and the stop 843 abuts the turnover portion 832 through the abutment portion. For example, the abutment portion is an abutment groove, and the outermost turnover pawl 8321 abut the abutment groove to achieve the abutment of the turnover portion 832 and the stop 843.

As shown in FIGS. 23 to 28, for ease of understanding of the present application, the working process of the turnover assembly 83 and the first stop assembly 84 is described as follows: When the posture of the material does not need to be adjusted, the turnover portion 832 does not operate and abuts the stop 843 to make the stop 843 pressed under the rolling portions 821, the elastic connector 842 is compressed, and the material is normally moved and conveyed on the rolling portions 821. When the posture of the material needs to be adjusted, the turnover portion 832 rotates under the driving of the driving portion 831 and extends through the gaps and abuts the material to turn over the material so that the posture of the material is adjusted. Moreover, the stop 843 extends out of the gaps under the action of the restoring force of the elastic connector 842 to stop the material, preventing the next material from interfering with the material at the turnover portion 832, and ensuring that the material posture adjustment can be performed normally. When the material posture adjustment is completed, the turnover portion 832 is reset, meanwhile, the stop 843 is pressed, the elastic connector 842 is compressed, and the stop 843 is restored below the rolling portions 821.

In the solutions of the posture adjustment mechanism 8, the posture adjustment mechanism 8 also includes a second stop assembly 85, where the second stop assembly 85 is mounted on the rack 81 and is configured to partially stop the material to adjust the horizontal posture of the material.

Figure 23:
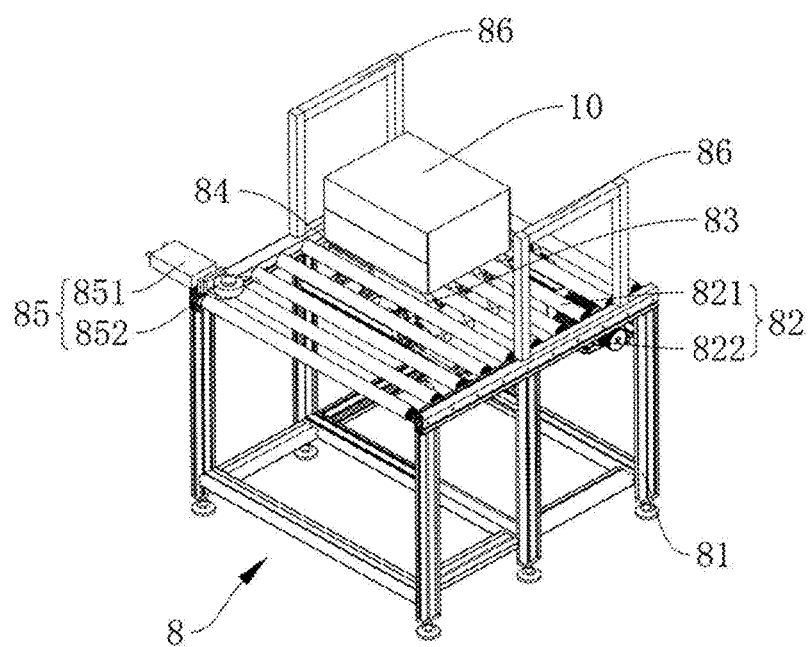
FIG. 23 is a structure view of a posture adjustment mechanism according to an embodiment of the present application.
Figure 28:
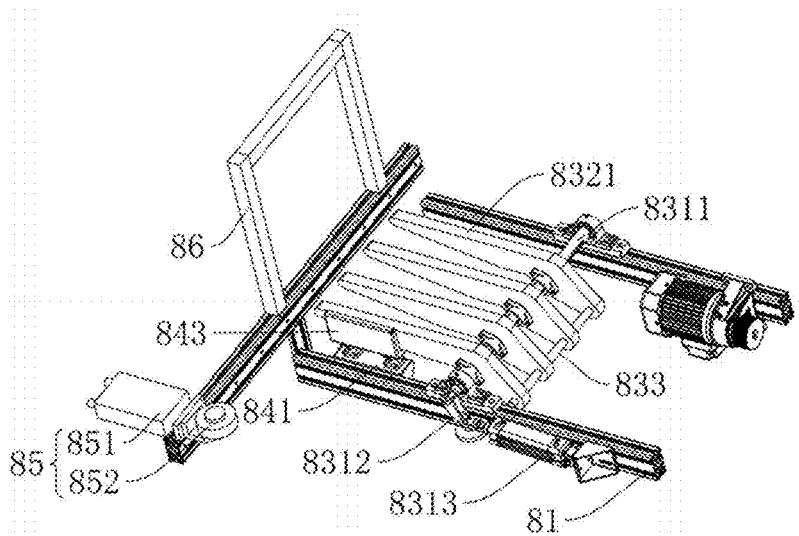
FIG. 28 is a structure view illustrating that a first stop assembly abuts a turnover assembly according to an embodiment of the present application.

As shown in FIGS. 23 and 28, the second stop assembly 85 includes a second telescopic cylinder 851 and a stop wheel 852, where the second telescopic cylinder 851 is connected to the stop wheel 852. The second telescopic cylinder 851 is mounted on the rack 81. The stop wheel 852 is connected to the output end of the second telescopic cylinder 851. The stop wheel 852 can rotatably abut the material to adjust the horizontal posture of the material while reducing the friction against the material.

For example, the second telescopic cylinder 851 is fixedly mounted on the rack 81. Moreover, the output end of the second telescopic cylinder 851 can extend and retract toward an area on the rolling portions 821 to drive the stop wheel 852 to extend and retract to partially stop the moving material. The unstopped part of the material continues to move forward under the action of the rolling portions 821, and the stopped part is forced to stop so that the material rotates around the center of the stop wheel 852 to achieve the horizontal posture adjustment of the material. It is very convenient to control the horizontal posture adjustment of the material by extending and retracting the second telescopic cylinder 851. In the present application, the turnover assembly 83 and the second stop assembly 85 work together to adjust the vertical and horizontal posture of the material, which is very convenient, and the whole device is simple and has strong practicality.

To stop the material and prevent the material from falling down during the posture adjustment, the posture adjustment mechanism 8 also includes a stop portion 86, where the stop portion is fixedly mounted on the rack 81. Optionally, two stop portions 86 are provided and are disposed opposite to each other on two sides of the turnover assembly 83 to stop the material on two sides.

To improve the automation degree of the posture adjustment mechanism 8, the posture adjustment mechanism 8 also includes a control unit, where the control unit is signally connected to the movement assembly 82, the turnover assembly 83, the first stop assembly 84, and the second stop assembly 85 to automatically control turning-on and turning-off of the movement assembly 82, the turnover assembly 83, the first stop assembly 84, and the second stop assembly 85, thereby saving manpower and material resources. In other embodiments, turning-on and turning-off of the above assemblies may also be manually control, and is not limited in this embodiment.

The posture adjustment mechanism 8 also includes a displacement sensor, where the displacement sensor is connected to the control unit to feedback material information to the control unit, and the control unit sends a signal to control the movement assembly 82, the turnover assembly 83, the first stop assembly 84, or the second stop assembly 85 to be turned on.

As shown in FIG. 1, optionally, two ends of the conveying mechanism 9 are connected to the posture adjustment mechanism 8 and a diverting mechanism on the palletizer, respectively, to convey the posture-adjusted materials to the diverting mechanism for diverting, the materials are conveyed to the feed diverting device 2 through the diverting mechanism and the conveyor belt 7, and the feed diverting device 2 diverts the materials to the feeding device 1, and the feeding device 1 extends and retracts according to the material palletizing position to palletize the materials to a designated position. The logistics palletizing system of the present application achieves operations of posture adjustment, automatic conveying, diverting and palletizing of the materials, and has high integration and wide applicability.

For example, the conveying mechanism 9 is a telescopic belt conveyor that can extend and retract according to the distance from the conveying mechanism 9 to the palletizer to satisfy the conveying of different distances, and is very convenient. The structure and principle of the telescopic belt conveyor are related art, and the details are not repeated herein. The conveying mechanism 9 is configured to be liftable to adapt to the palletizer of different heights, making the palletizer highly adaptable. For example, the conveying mechanism 9 may be up and down through a hydraulic cylinder. In other embodiments, the conveying mechanism 9 may also be up and down through the slide rails fitted with the lead screws, and is not limited in this embodiment.

In summary, the present application provides a logistics palletizing system. The logistics conveying device is connected to the palletizer to automatically convey and palletize the materials, improving the material handling efficiency, and saving manpower.

The logistics conveying device includes the posture adjustment mechanism 8 and the conveying mechanism 9 connected to the posture adjustment mechanism 8. The posture adjustment mechanism 8 includes the movement assembly 82 and the turnover assembly 83, the movement assembly 82 includes multiple rotatable rolling portions 821, a gap is formed between each two adjacent rolling portions 821, and the multiple rotatable rolling portions 821 are configured to drive the materials to move. The turnover assembly 83 includes the driving portion 831 and the turnover portion 832, the turnover portion 832 is drivingly connected to the driving portion 831, the driving portion 832 is configured to drive the turnover portion 831 to rotate, the turnover portion 832 extends through gaps among the multiple rotatable rolling portions 821 to push the materials to a preset position, thereby adjusting the material posture. Moreover, the structure is simple and compact, reducing the space occupation, and saving the production and manufacturing costs. The conveying mechanism 9 achieves the long-distance conveying of the materials.

The palletizer is configured to palletize and stack the materials. The palletizer moves through the walking devices 5. The feed diverting device 2 diverts the materials to the feeding devices 1, the multi-stage lifting devices 4 drive the feeding devices 1 up and down to the palletizing height, the telescopic platform devices 3 drives the feeding devices 1 to expand and retract to make the materials telescopically moved to the palletizing position, and the feeding devices 1 can palletize the materials, improving the automation degree of the palletizer and achieving the accurate palletizing of the materials.

What is claimed is:

1. A logistics palletizing system, comprising:
   a palletizer comprising: a feeding device, a feed diverting device, a telescopic platform device, a multi-stage lifting device and a walking device, wherein the telescopic platform device is mounted above the walking device, the multi-stage lifting device and the feed diverting device are each mounted on the telescopic platform device, and the telescopic platform device is configured to drive the multi-stage lifting device and the feed diverting device to move in a first preset direction relative to the walking device;

wherein the feeding device is mounted on the multi-stage lifting device, the multi-stage lifting device is configured to drive the feeding device up and down, the feed diverting device is configured to convey materials to the feeding device, and the feeding device is configured to palletize the materials; and a logistics conveying device, wherein the logistics conveying device is connected to the palletizer and comprising a posture adjustment mechanism and a conveying mechanism connected to the posture adjustment mechanism, wherein the posture adjustment mechanism comprises a movement assembly and a turnover assembly, the movement assembly comprises a plurality of rotatable rolling portion, a gap is formed between each two adjacent rolling portions of the plurality of rotatable rolling portions, and the plurality of rotatable rolling portions are configured to drive the materials to move; the turnover assembly comprises a driving portion and a turnover portion, the turnover portion is drivingly connected to the driving portion, the driving portion is configured to drive the turnover portion to rotate, the turnover portion extends through gaps among the plurality of rotatable rolling portions, the turnover portion is configured to push the materials to a preset position, and the conveying mechanism is configured to convey the materials;

wherein the posture adjustment mechanism further comprises a first stop assembly, and the first stop assembly comprises:

a base;

an elastic connector, wherein the elastic connector is mounted on the base;

a stop, wherein the stop is fixedly connected to the elastic connector, the stop is configured to extend through the gaps to abut the materials, and the stop is capable of abutting the turnover portion; and wherein the stop is provided with an abutment portion, and the stop abuts the turnover portion through the abutment portion.

2. The logistics palletizing system according to claim 1, wherein the driving portion comprises:

a first rotary shaft, wherein the first rotary shaft is fixedly connected to the turnover portion;

a hinge, wherein the hinge is fixedly connected to the first rotary shaft; and a first telescopic cylinder, wherein an output end of the first telescopic cylinder is hinged to the hinge, and the first telescopic cylinder is configured to drive the hinge to rotate, to drive the first rotary shaft to rotate.

3. The logistics palletizing system according to claim 1, wherein the feeding device comprises a pallet mechanism, a push plate mechanism and a fixed plate, wherein the pallet mechanism and the push plate mechanism are each mounted on the multi-stage lifting device through the fixed plate, the pallet mechanism is configured to carry the materials, the pallet mechanism is adjustable in length in an X direction, the push plate mechanism is disposed on a first side of the pallet mechanism and is configured to push the materials on the pallet mechanism toward a second side of the pallet mechanism to palletize the materials, the push plate mechanism comprises a push plate assembly and a telescopic assembly, wherein the telescopic assembly is mounted on the fixed plate and drivingly connected to the push plate assembly, and the telescopic assembly is configured to drive the push plate assembly to push off down the materials from the pallet mechanism.

4. The logistics palletizing system according to claim 3, wherein the telescopic assembly comprises a first scissor arm member and a first driving member, one end of the first scissor arm member is hinged to the fixed plate and an other end of the first scissor arm member is drivingly connected to the push plate assembly, the first driving member is drivingly connected to the first scissor arm member, the first driving member is configured to drive the first scissor arm member to elongate or shorten; and wherein the first scissor arm member comprises two sets of opposite front scissor arms and two sets of opposite rear scissor arms, each set of front scissor arms and each set of rear scissor arms each comprises two scissor arms that are centrally hinged, the two sets of opposite front scissor arms are hinged to the two sets of opposite rear scissor arms to form a plurality of first hinge points, and opposite first hinge points are connected through a first connecting shaft; and one end of the first driving member is hinged to one first connecting shaft, and an other end of the first driving member is hinged to the push plate assembly.

5. The logistics palletizing system according to claim 3, wherein the push plate assembly comprises a push plate, a first push bar and a second push bar, wherein the first push bar is secured to a bottom of the push plate, and the second push bar is slidably connected in a length direction of the first push bar; and wherein the second push bar is provided with a clamping groove, the clamping groove is clamped to an edge of the pallet mechanism, and the pallet mechanism is configured to drive the second push bar to elongate or shorten.

6. The logistics palletizing system according to claim 3, wherein the pallet mechanism comprises a plurality of conveyor rollers, a driving plate and a second scissor arm member arranged in the X direction, wherein the second scissor arm member comprises a plurality of scissor arms that are hinged to each other, a plurality of second hinge points are formed among the plurality of scissor arms that are hinged to each other, opposite second hinge points located above the second scissor arm member are connected through the plurality of conveyor rollers, spacings among the plurality of conveyor rollers are adjustable, the plurality of conveyor rollers are configured to carry the materials, the driving plate is drivingly connected to one end of the second scissor arm member, and the driving plate is configured to drive the second scissor arm member to elongate or shorten; and wherein a position sensor is disposed on the driving plate and is configured to measure a distance from the driving plate to an obstacle.

7. The logistics palletizing system according to claim 1, wherein a number of feeding devices is two and a number of multi-stage lifting devices is two, one feeding device is mounted on one multi-stage lifting device, and the two multi-stage lifting devices synchronously drive the two feeding devices up and down; and the feed diverting device is disposed between the two feeding devices and is configured to convey the materials to the two feeding devices.

8. The logistics palletizing system according to claim 1, wherein the feed diverting device comprises a seat, a plurality of rotary assemblies and a driving assembly, wherein the plurality of rotary assemblies are rotatably disposed on the seat, a plurality of first Mecanum wheels are fixedly disposed on each of the plurality of rotary assemblies, the plurality of rotary assemblies comprises a plurality of first rotary assemblies and a plurality of second rotary assemblies, the first Mecanum wheels on the first rotary assemblies and the first Mecanum wheels on the second rotary assemblies have opposite mounting directions, the plurality of first rotary assemblies and the plurality of second rotary assemblies are alternately arranged in sequence, the rotary assemblies drive the plurality of first Mecanum wheels to rotate, so as to drive the materials to move in a second preset direction, the driving assembly is mounted on the seat, the driving assembly is drivingly connected to the plurality of rotary assemblies and the driving assembly drives the plurality of rotary assemblies to rotate;

wherein the first rotary assemblies are rotated by one driving assembly, and the plurality of second rotary assemblies are rotated by another driving assembly; and wherein the driving assembly comprises a first driving motor and a first conveyor belt drivingly connected to the first driving motor, wherein the first driving motor is fixedly mounted on the seat, and the first conveyor belt is drivingly connected to the rotary assembly.

9. The logistics palletizing system according to claim 1, wherein each of the multi-stage lifting devices comprises a primary lifting mechanism and a secondary lifting mechanism, the feeding device is mounted on the primary lifting mechanism, the primary lifting mechanism is configured to drive the feeding device up and down, the primary lifting mechanism is mounted on the secondary lifting mechanism, the secondary lifting mechanism is configured to drive the primary lifting mechanism up and down.

10. The logistics palletizing system according to claim 1, wherein the walking device comprises a chassis and a movement mechanism, the chassis is mounted on the movement mechanism, the telescopic platform device is mounted on the chassis, and the movement mechanism is a track-type driven or wheel driven structure.

11. A logistics palletizing system, comprising:

a palletizer comprising: a feeding device, a feed diverting device, a telescopic platform device, a multi-stage lifting device and a walking device, wherein the telescopic platform device is mounted above the walking device, the multi-stage lifting device and the feed diverting device are each mounted on the telescopic platform device, and the telescopic platform device is configured to drive the multi-stage lifting device and the feed diverting device to move in a first preset direction relative to the walking device;

wherein the feeding device is mounted on the multi-stage lifting device, the multi-stage lifting device is configured to drive the feeding device up and down, the feed diverting device is configured to convey materials to the feeding device, and the feeding device is configured to palletize the materials; and a logistics conveying device, wherein the logistics conveying device is connected to the palletizer and comprising a posture adjustment mechanism and a conveying mechanism connected to the posture adjustment mechanism, wherein the posture adjustment mechanism comprises a movement assembly and a turnover assembly, the movement assembly comprises a plurality of rotatable rolling portion, a gap is formed between each two adjacent rolling portions of the plurality of rotatable rolling portions, and the plurality of rotatable rolling portions are configured to drive the materials to move; the turnover assembly comprises a driving portion and a turnover portion, the turnover portion is drivingly connected to the driving portion, the driving portion is configured to drive the turnover portion to rotate, the turnover portion extends through gaps among the plurality of rotatable rolling portions, the turnover portion is configured to push the materials to a preset position, and the conveying mechanism is configured to convey the materials, and wherein the telescopic platform device comprises: a primary telescopic platform, a secondary telescopic platform, a submount and a speed-doubling telescopic assembly, the primary telescopic platform is configured to carry the multi-stage lifting devices, the secondary telescopic platform is located below the primary telescopic platform, the primary telescopic platform is slidably connected to the secondary telescopic platform, the submount is mounted on the walking device and located below the secondary telescopic platform, the secondary telescopic platform is slidably connected to the submount, a second driving member is disposed on the submount and is configured to drive the secondary telescopic platform to extend and retract, the submount is drivingly connected to the primary telescopic platform through the speed-doubling telescopic assembly, in a case where the secondary telescopic platform is stretched out and drew back relative to the submount, the speed-doubling telescopic assembly is configured to drive the primary telescopic platform to extend and retract relative to the secondary telescopic platform.

12. The logistics palletizing system according to claim 11, wherein the speed-doubling telescopic assembly comprises a first chain and a second chain, a first axle is disposed on a second end of the secondary telescopic platform, and a second axle is disposed on a first end of the secondary telescopic platform;

the first chain is wound around the first axle, one end of the first chain is connected to a first end of the primary telescopic platform, an other end of the first chain is connected to the submount, and the first chain is configured to drive the primary telescopic platform to move in a direction away from the secondary telescopic platform; and the second chain is wound around the second axle, one end of the second chain is connected to the first end of the primary telescopic platform, an other end of the second chain is connected to the submount, and the second chain is configured to drive the primary telescopic platform to move in a direction facing the secondary telescopic platform;

wherein the first axle and the second axle both are chainwheels; and wherein the number of first chains is two, the number of second chains is two, the number of first axles is two and the number of second axles is two.

13. A logistics palletizing system according to claim 11, wherein the telescopic platform device further comprises: a first landing gear assembly and a second landing gear assembly, wherein the first landing gear assembly is mounted on a bottom of the primary telescopic platform and is configured to support the stretched-out primary telescopic platform, and the second landing gear assembly is mounted on a bottom of the secondary telescopic platform and is configured to support the stretched-out secondary telescopic platform.

14. The logistics palletizing system according to claim 13, wherein the first landing gear assembly is disposed at a bottom of a second end of the primary telescopic platform, the first landing gear assembly comprises a first connecting rod, a first roller and a third driving member, wherein one end of the first connecting rod is hinged to an end portion of the second end of the primary telescopic platform, an other end of the first connecting rod is mounted with the first roller, the third driving member is mounted on the bottom of the primary telescopic platform, an output end of the third driving member is drivingly connected to one end of the first connecting rod closing to the first roller, the third driving member is configured to drive the first connecting rod to rotate around the primary telescopic platform, to support the primary telescopic platform.

15. The logistics palletizing system according to claim 14, wherein the second landing gear assembly is disposed at a bottom of the second end of the secondary telescopic platform, the secondary telescopic platform comprises a second connecting rod, a second roller and a fourth driving member, wherein one end of the second connecting rod is hinged to the bottom of the secondary telescopic platform, the second roller is mounted on an other end of the second connecting rod, the fourth driving member is mounted at an end portion of the second end of the secondary telescopic platform, an output end of the fourth driving member is drivingly connected to one end of the second connecting rod closing to the second roller, and the fourth driving member is configured to drive the second connecting rod to rotate around the secondary telescopic platform to support the secondary telescopic platform.

16. The logistics palletizing system according to claim 11, wherein an outer sidewall of the secondary telescopic platform is provided with a first guide rail, and a first pulley matched with the first guide rail is disposed on each of two sides of the primary telescopic platform and is slidably connected to the first guide rail; and
an outer sidewall of the primary telescopic platform is provided with a second guide rail, a second pulley matched with the second guide rail is disposed on each of two sides of the secondary telescopic platform and is slidably connected to the second guide rail.

17. A logistics palletizing system, comprising:
a palletizer comprising: a feeding device, a feed diverting device, a telescopic platform device, a multi-stage lifting device and a walking device, wherein the telescopic platform device is mounted above the walking device, the multi-stage lifting device and the feed diverting device are each mounted on the telescopic platform device, and the telescopic platform device is configured to drive the multi-stage lifting device and the feed diverting device to move in a first preset direction relative to the walking device;
wherein the feeding device is mounted on the multi-stage lifting device, the multi-stage lifting device is configured to drive the feeding device up and down, the feed diverting device is configured to convey materials to the feeding device, and the feeding device is configured to palletize the materials; and a logistics conveying device, wherein the logistics conveying device is connected to the palletizer and comprising a posture adjustment mechanism and a conveying mechanism connected to the posture adjustment mechanism, wherein the posture adjustment mechanism comprises a movement assembly and a turnover assembly, the movement assembly comprises a plurality of rotatable rolling portion, a gap is formed between each two adjacent rolling portions of the plurality of rotatable rolling portions, and the plurality of rotatable rolling portions are configured to drive the materials to move: the turnover assembly comprises a driving portion and a turnover portion, the turnover portion is drivingly connected to the driving portion, the driving portion is configured to drive the turnover portion to rotate, the turnover portion extends through gaps among the plurality of rotatable rolling portions, the turnover portion is configured to push the materials to a preset position, and the conveying mechanism is configured to convey the materials, and
wherein the palletizer further comprises a translation device and a conveyor belt;
the translation device is disposed on the walking device;
the feeding device, the feed diverting device, the telescopic platform device, the multi-stage lifting device and the conveyor belt constitute a body portion of the palletizer, the body portion is disposed above the translation device, the translation device is configured to push the body portion to move in an X direction; and
the telescopic platform device and the conveyor belt are each connected to an output end of the translation device.

18. The logistics palletizing system according to claim 17, wherein the translation device comprises:
a translation cylinder, a body of the translation cylinder is secured to the walking device, and a piston of the translation cylinder is connected to the body portion;
wherein the translation device further comprises:
a first slide rail disposed on the walking device in the X direction; and
a first slider slidably fitted with the first slide rail, wherein the body portion is secured to the first slider; and
wherein a number of first slide rails is two, the two first slide rails are disposed in parallel, and a plurality of first sliders are disposed on each of the two first slide rails.

19. The logistics palletizing system according to claim 17, wherein the body portion further comprises:
a regularized device disposed above the conveyor belt and configured to regulate and position the materials on the conveyor belt; and
wherein the regularized device comprises two servomotors and two regularized plates, an output end of each of the two servomotors is connected to one regularized plate, the two servomotors are configured to drive the two regularized plates approach each other to move the materials toward a middle of the conveyor belt, and a triangular reinforcing plate is disposed on a top of each of the two regularized plates.

* * * * *